United States Patent
Nakata et al.

(10) Patent No.: US 7,650,760 B2
(45) Date of Patent: Jan. 26, 2010

(54) MOTOR CONTROLLING DEVICE, COMPRESSOR, AIR CONDITIONER AND REFRIGERATOR

(75) Inventors: Hideki Nakata, Katano (JP); Mitsuo Ueda, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 10/552,662

(22) PCT Filed: Apr. 21, 2004

(86) PCT No.: PCT/JP2004/005691

§ 371 (c)(1),
(2), (4) Date: Oct. 11, 2005

(87) PCT Pub. No.: WO2004/095684

PCT Pub. Date: Nov. 4, 2004

(65) Prior Publication Data

US 2006/0179859 A1    Aug. 17, 2006

(30) Foreign Application Priority Data

Apr. 22, 2003 (JP) .............................. 2003-117149

(51) Int. Cl.
*F25B 49/00* (2006.01)
*H02P 7/00* (2006.01)
*H02P 23/00* (2006.01)

(52) U.S. Cl. .................. 62/228.1; 62/230; 318/722; 361/22

(58) Field of Classification Search ................ 62/228.1, 62/230; 318/254.1, 722; 361/22
See application file for complete search history.

(56) References Cited

U.S. PATENT DOCUMENTS

| 4,922,169 | A   | * | 5/1990  | Freeman ................... 318/400.1 |
| 5,461,295 | A   | * | 10/1995 | Horst ........................ 318/701 |
| 5,723,967 | A   | * | 3/1998  | Hongo et al. ............ 318/400.11 |
| 6,208,109 | B1  | * | 3/2001  | Yamai et al. ................ 318/716 |
| 6,304,465 | B1  | * | 10/2001 | Takita ........................... 363/37 |
| 6,781,802 | B2  | * | 8/2004  | Kato et al. ..................... 361/22 |

FOREIGN PATENT DOCUMENTS

| JP | 03139197   | A | * | 6/1991 |
| JP | 11-266595  |   |   | 9/1999 |
| JP | 2001-086782 | A |   | 3/2001 |
| JP | 2002-095261 | A |   | 3/2002 |
| JP | 2002-218789 | A |   | 8/2002 |

* cited by examiner

*Primary Examiner*—Marc E Norman
(74) *Attorney, Agent, or Firm*—McDermott Will & Emery LLP

(57) ABSTRACT

A motor controller (101) according to the invention comprises an inverter circuit (3) for driving a brushless motor (4) and a control unit for controlling the rotational speed of the brushless motor (4) by controlling the phase of the motor current of the brushless motor (4) through the inverter circuit (3).

11 Claims, 18 Drawing Sheets (a)

(b)

MOTOR CONTROLLING DEVICE, COMPRESSOR, AIR CONDITIONER AND REFRIGERATOR

TECHNICAL FIELD

The present invention relates to a motor controller, a compressor and electric equipment which use the motor controller, and more particularly relates to a system for controlling a brushless motor.

BACKGROUND OF THE INVENTION

In recent years, there have been proposed motor controllers which have, at the input side of the inverter circuit, a small-capacity capacitor in place of a large-capacity smoothing capacitor in view of resource saving and cost reduction.

FIG. 13 is a circuit diagram showing a configuration of such motor controllers. In the motor controller shown in FIG. 13 (hereinafter referred to as the first prior art), since a capacitor 203 is small in capacity, an input voltage to be applied to an inverter circuit 204, which has been obtained by rectifying the output voltage of an a.c. electric power source 201 with a rectifier circuit 202, cannot been satisfactorily smoothed, so that the input voltage has a pulsating waveform. The voltage with such pulsation synchronizes with the output voltage of the a.c. power source 201 and has frequency twice that of the output voltage of the a.c. power source 201. To cope with this, a desired torque command to be input to a brushless motor 205 is made to have a waveform which is synchronous with and analogous to the input voltage for the inverter circuit 204 as shown in FIG. 14(a). Thereby, the brushless motor 205 can be driven even with a pulsating voltage and the input current I from the a.c. electric power source 201 has a sinusoidal waveform as shown in FIG. 14(b), so that the power factor can be prevented from decreasing (e.g., Japanese Patent Publication Kokai No. 2002-51589 (FIGS. 1 and 9)).

In the case of brushless motors which drive a compressor used for air conditioners, refrigerators, etc., noise and vibration occur especially in a low rotational speed region, owing to great load fluctuation per rotation. Noise and vibration are caused, especially, in rotary-type compressors and reciprocation-type compressors, for the reason that the load torque imposed on the brushless motor largely fluctuates, as shown in FIG. 15, according to the rotational phase (rotor angle) of the motor to be maximum with the timing at which the refrigerant is discharged so that the load torque pulsates while the rotor making one rotation. The pulsation becomes more intense with the average rotational speed decreasing, and the intense pulsation is accompanied with increases in the amplitude of vibration. As an attempt to solve this, there has been proposed a method for controlling motor current so as to reduce vibration taking the load fluctuation into account. In this motor current control method (hereinafter referred to as "the second prior art"), acceleration or a change in speed per rotation is computed from an estimated rotational speed of the motor, and a motor current command (amplitude command) is prepared so as to make the change small. More specifically, the rotational phase of the motor is divided into desired sections and, for every divided section, a torque command correction amount for reducing vibration is prepared from the acceleration or the change in speed to add to the motor current command. In this motor current control method, since the motor current command largely increases or decreases once per rotation of the rotor, the power supply rate of the a.c. power source also largely increases or decreases each time the motor rotates, resulting in a drop in the power factor. To prevent the power factor from dropping, a high-capacity inductor and high-capacity smoothing capacitor are employed (e.g., Japanese Patent Publication Kokai No. 2001-37281 (FIG. 13)).

However, the first prior art has not proved successful in reducing noise and vibration when applied to a compressor in which a load fluctuation occurs per rotation, because the torque command varies with frequency twice the frequency of the power source and the frequency of the load fluctuation differs from the frequency twice the frequency of the power source. The second prior also has revealed the problem that if the capacity of the inductor or smoothing capacitor is simply reduced with the intention of resource saving or cost reduction, the power factor will drop, giving adverse effects to the power source system.

DISCLOSURE OF THE INVENTION

The invention is directed to overcoming the foregoing shortcomings and a primary object of the invention is therefore to provide a motor controller and a compressor and electric equipment which employ it, the motor controller being capable of restricting occurrence of vibration caused by load torque fluctuations without a drop in the power factor even if the capacity of the inductor or smoothing capacitor is reduced.

The above object can be accomplished by a motor controller constructed according to a first aspect of the invention, the motor controller comprising:

an inverter circuit for driving a brushless motor; and a control unit for controlling the rotational speed of the brushless motor by controlling the phase of the motor current of the brushless motor through the inverter circuit. This arrangement makes it possible to control the output torque of the brushless motor without causing rotational speed fluctuations, by controlling the phase of the motor current. In this case, the amplitude of the motor current does not change and it is therefore possible to mitigate vibration caused by load torque fluctuations without a drop in the power factor even when a high-capacity inductor or high-capacity smoothing capacitor is not used.

The control unit may control the phase of the motor current so as to restrict the rotational speed fluctuation of the brushless motor caused by load torque fluctuation.

The control unit may detect the rotational speed fluctuation and rotational phase of the brushless motor based on the rotation of the brushless motor and may control the phase of the motor current based on the rotational speed fluctuation and rotational phase which have been detected.

The control unit may estimate the rotational speed and rotational phase of the brushless motor based on the motor current of the blushless motor, thereby detecting the rotational speed fluctuation and the rotational phase. This enables detection of the rotational speed fluctuation and the rotational phase with a simple arrangement.

The control unit may control the phase and amplitude of the motor current of the blushless motor thereby controlling the rotational speed of the blushless motor.

The control unit may control the phase and amplitude of the motor current so as to restrict the rotational speed fluctuation of the brushless motor caused by load torque fluctuation. This enables it to restrict the rotational speed fluctuation by controlling the phase and amplitude of the motor current in a desired ratio, so that a motor controller having a higher degree of freedom can be achieved. In addition, the power factor can be set to a desired value.

A rectifier for rectifying an a.c. power output from an a.c. power source to output to the inverter circuit may be further provided, and the control unit may control the amplitude of the motor current according to the absolute value of the output voltage of the a.c. power source. This enables it to control the amplitude of the motor current such that it becomes small during the period when the absolute value of the output voltage of the a.c. power source increases and becomes great during the period when the absolute value of the output voltage of the a.c. power source decreases, whereby the current output from the a.c. power source can be made smoother and the power factor can be further increased.

A capacitor may be further interposed between d.c. power input terminals of the inverter circuit. This allows a flow of charging current from the a.c. power source to the capacitor when the output voltage of the a.c. power source connected through the rectifier is higher than the hold voltage of the capacitor, so that the period of electric conduction can be prolonged that much and the power factor can be further improved. In the case of a motor controller having no smoothing capacitor, vibration cannot be reduced in spite of controlling the current phase or amplitude of the motor when high-load operation is performed. In such high-load operation, when output torque is small, that is, the motor current is small, the capacitor is charged to increase the electric current flowing from the a.c. power source, so that the output torque becomes large. And, when the motor current is large, the motor current can be increased by discharging electricity from the capacitor, so that even if the high-load operation is carried out, vibration can be restricted without causing a drop in the power factor.

The brushless motor may drive a load the torque of which fluctuates so as to have one peak per rotation of the brushless motor. With this arrangement, the invention exerts particularly remarkable effects.

According to the invention, there is provided a compressor having the brushless motor controlled by the motor controller of claim 9 as a driving source.

According to the invention, there is provided an air conditioner having the compressor of claim 10 as refrigerant compressing means.

According to the invention, there is provided a refrigerator having the compressor of claim 10 as refrigerant compressing means.

According to a second aspect of the invention, there is provided a motor controller comprising:

a power converter for converting an a.c. power output from an a.c. power source into a d.c. power;

an inverter circuit for supplying the d.c. power obtained through the conversion by use of the power converter to a brushless motor, thereby driving the brushless motor;

a capacitor connected between d.c. power input terminals of the inverter circuit; and a control unit for controlling the rotational speed of the brushless motor by controlling a motor current of the brushless motor through the inverter circuit, wherein the control unit controls the motor current so as to restrict the rotational speed fluctuation of the brushless motor caused by load torque fluctuation and controls a current output from the a.c. power source based on the comparison between the amplitude of the motor current and the average of the motor current. With this arrangement, the power factor can be properly increased by determining whether the motor current is large or small based on the comparison between the amplitude of the motor current and the average of the motor current.

The control unit controls a current output from the a.c. power source such that during the period when the amplitude of the motor current is smaller than the average of the motor current, the capacitor is charged, and during the period when the amplitude of the motor current is larger than the average, the capacitor discharges electricity. With this arrangement, a current output from the a.c. power source is controlled according to the charge/discharge of the capacitor, so that the power factor can be further increased.

The power converter is a rectifier, and a switching element is serially connected to the capacitor between the d.c. power input terminals of the inverter circuit. The control unit controls a current output from the a.c. power source by turning the switching element ON and OFF.

The control unit controls a current output from the a.c. power source such that during the period when the amplitude of the motor current is smaller than the average of the motor current, the amplitude decreases, and during the period when the amplitude of the motor current is larger than the average of the motor current, the amplitude increases.

The control unit controls the phase of the motor current so as to restrict the rotational speed fluctuation of the brushless motor caused by load torque fluctuation.

These objects as well as other objects, features and advantages of the invention will become apparent to those skilled in the art from the following description with reference to the accompanying drawings.

BRIEF DESCRIPTION OF DRAWINGS

FIG. 5 is waveform charts when a smoothing capacitor is omitted from a second prior art, wherein FIG. 5(a) shows a waveform of an a.c. power source current, FIG. 5(b) shows a waveform of a motor current, and FIG. 5(c) shows a waveform of a current amplitude command I*.

FIG. 6 is waveform charts associated with the first embodiment, wherein FIG. 6(a) shows a waveform of an a.c. power source current, FIG. 6(b) shows a waveform of a motor current, and FIG. 6(c) shows a waveform of a current phase command $\beta^*$.

FIG. 9 is waveforms associated with the third embodiment of the invention, wherein FIG. 9(a) shows a waveform of the input voltage of an inverter circuit and FIG. 9(b) shows a waveform of a current amplitude command I*.

BEST MODE FOR CARRYING OUT THE INVENTION

First Embodiment

Figure 1:
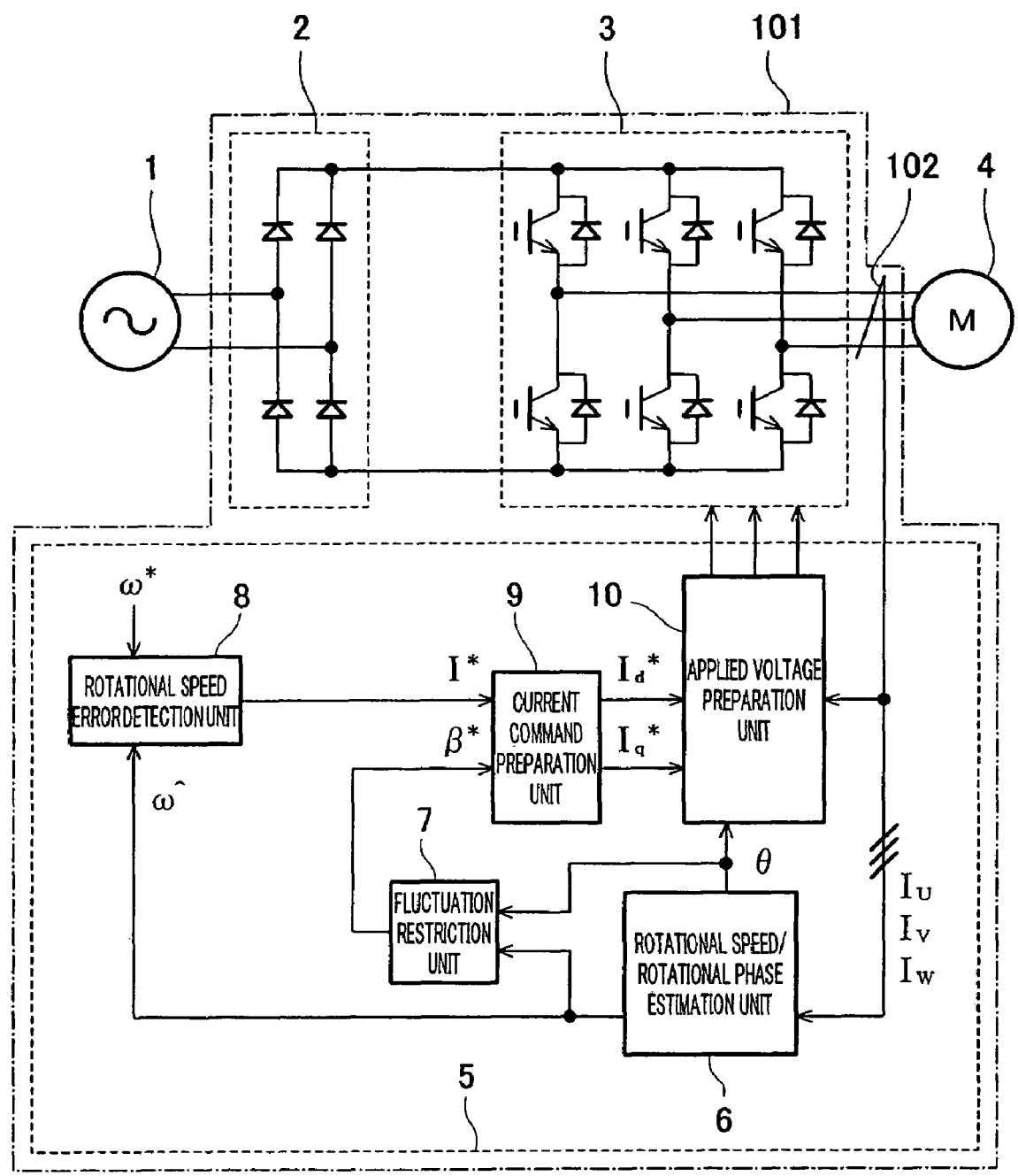
FIG. 1 is a block diagram showing a configuration of a motor controller according to a first embodiment of the invention.

FIG. 1 is a block diagram showing a configuration of a motor controller according to a first embodiment of the invention.

Turning now to FIG. 1, the motor controller 101 of the first embodiment includes: a rectifier circuit 2 for rectifying an a.c. power output from a single-phase a.c. power source (hereinafter referred to as "an a.c. power source") 1; an inverter circuit 3 for converting a d.c. power obtained by the rectifier circuit 2 into an a.c. power to supply to a brushless motor 4; and a current sensor 102 for detecting a current (hereinafter referred to as "a motor current") flowing in the blushless motor 4; and a control unit 5 for drivingly controlling the inverter circuit 3 based on the motor current detected by the current sensor 102. Herein, the brushless motor 4 drives, for instance, a compressor (not shown).

Herein, the rectifier 2 consists of a full-wave rectifier and the inverter circuit 3 consists of a voltage-type inverter.

The control unit 5 consists of a computing unit such as a micro-computer and includes a rotational speed/rotational phase estimation unit 6, a fluctuation restriction unit 7, a rotational speed error detection unit 8, a current command preparation unit 9 and an applied voltage preparation unit 10.

The rotational speed/rotational phase estimation unit 6 estimates the rotational phase and rotational speed of the brushless motor 4 based on the motor current detected by the current sensor 102 and outputs them as an estimated rotational speed $\hat{\omega}$ and an estimated rotational phase $\theta$. Herein, the current sensor 102 detects a current flowing in a three-phase coil of the brushless motor 4. The estimation of the rotational phase and rotational speed may be done by use of a voltage value applied to the brushless motor 4, a motor constant indicative of a characteristic of the brushless motor 4, etc. Alternatively, the estimation may utilize the conventional technique commonly used in position-sensorless sinusoidal driving of a blushless motor. In the case of a motor controller for driving a brushless motor having a position sensor, the rotational phase and rotational speed may be obtained based on a signal from the position sensor. In this case, the need for the rotational speed/rotational phase estimation unit 6 is obviated.

The fluctuation restriction unit 7 computes the rotational speed fluctuation of the brushless motor 4 caused by load torque fluctuation based on the estimated rotational speed $\hat{\omega}$ output from the rotational speed/rotational phase estimation unit 6 and outputs a current phase command $\beta^*$ to the current command preparation unit 9 to restrict the rotational speed fluctuation of the brushless motor 4.

The rotational speed error detection unit 8 prepares a current amplitude command $I^*$ from an error corresponding to the difference between a rotational speed command $\omega^*$ input from the outside of the motor controller 101 and the estimated rotational speed $\hat{\omega}$ output from the rotational speed/rotational phase estimation unit 6 to output to the current command preparation unit 9.

The current command preparation unit 9 prepares a d-axis current command $I_d^*$ and a q-axis current command $I_q^*$ from the current amplitude command $I^*$ and current phase command $\beta^*$ which have been input, using the following Equation (2) and output them to the applied voltage preparation unit 10. As seen from Equation (2), the current phase command $\beta^*$ is indicative of the phase difference between the q-axis and motor current vector when the voltage and current supplied to the motor are plotted on a d/q coordinate system.

$$I_d^* = I^* \times \sin(\beta^*), I_q^* = I^* \times \cos(\beta^*) \qquad (2)$$

The applied voltage preparation unit 10 detects a d-axis current value $I_d$ and a q-axis current value $I_q$ from the motor current value detected by the current sensor 102 and the estimated rotational phase $\theta$ output from the rotational speed/rotational phase estimation unit 6, and prepares a value of voltage to be applied to the brushless motor 4 such that the d-axis current value $I_d$ and the q-axis current value $I_q$ become equal to the d-axis current command $I_d^*$ and the q-axis current command $I_q^*$. Then, the applied voltage preparation unit 10 outputs this voltage value to the inverter circuit 3 as a PWM signal. That is, feed-back control is performed such that the d-axis current value $I_d$ becomes equal to the d-axis current command $I_d^*$ and q-axis current value $I_q$ becomes equal to the q-axis current command $I_q^*$. As such feed-back control, the PI control generally known may be used or alternatively, other control methods than the PI control may be used. Since the input voltage of the inverter circuit 3 largely pulsates when preparing a value of voltage to be applied to the brushless motor 4, the input voltage of the inverter circuit 3 may be detected to correct the PWM signal (the PWM signal is not shown).

The inverter circuit 3 turns each switching element ON and OFF based on the PWM signal which has been input, thereby applying the voltage determined by the applied voltage preparation unit 10 to the brushless motor 4.

The series of operations described above is continuously effected in every control cycle, whereby the motor current of the brushless motor 4 has a desired current amplitude and current phase. As used herein, "the desired current amplitude and current phase" refer to such current amplitude and current phase that make the rotational speed of the brushless motor 4 comply with the rotational speed command $\omega^*$ and restrict the rotational speed fluctuation.

The configuration and principle of the fluctuation restriction unit 7 which features the invention will be explained by way of a concrete example.

Figure 2:
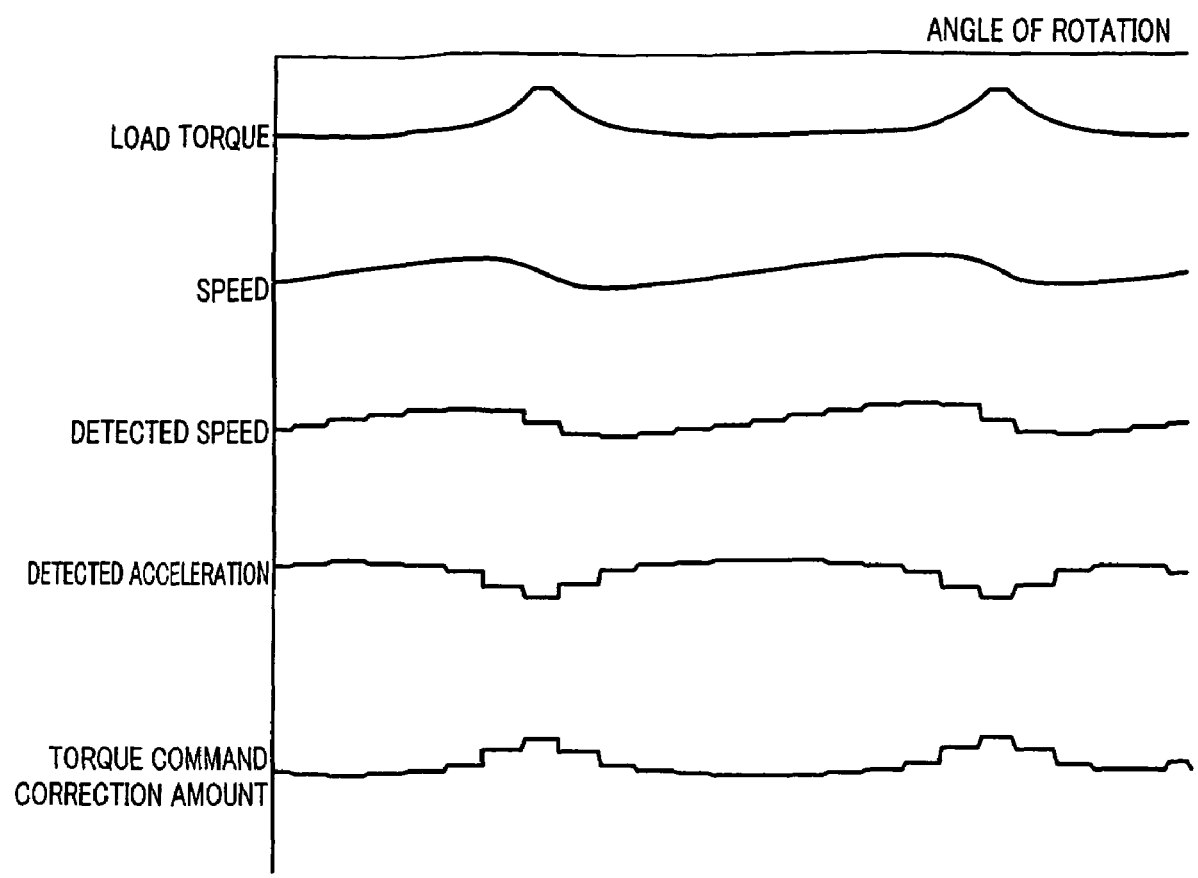
FIG. 2 shows one example of changes in load torque, speed, detected speed, detected acceleration and torque command correction amount, relative to the rotor angle of the brushless motor shown in FIG. 1.
Figure 3:
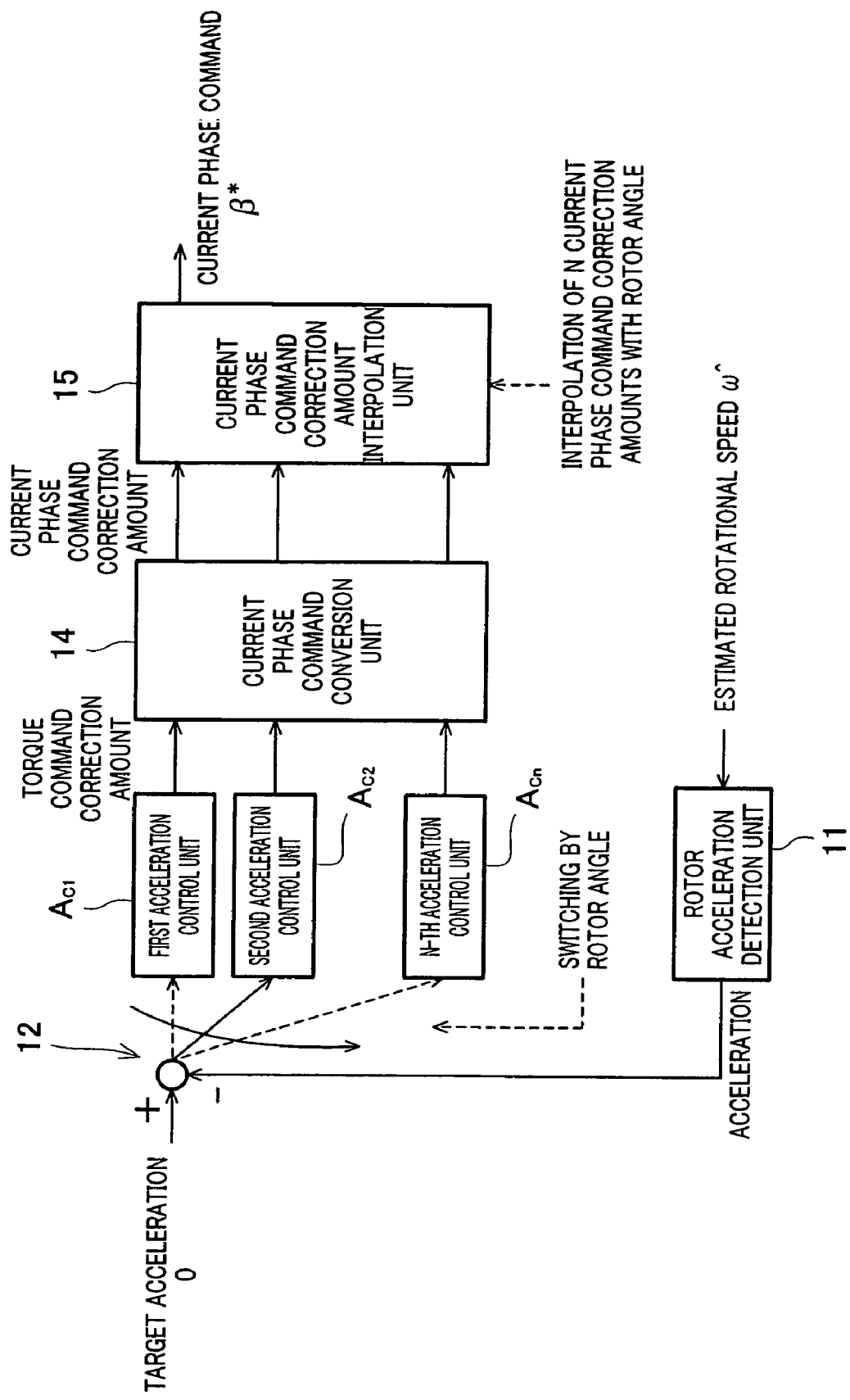
FIG. 3 is a block diagram showing a configuration of a fluctuation restriction unit.

FIG. 2 shows one example of changes in load torque, speed, detected speed, detected acceleration and torque command correction amount, relative to the rotor angle of the brushless motor shown in FIG. 1. FIG. 3 is a block diagram showing a configuration of the fluctuation restriction unit 7.

First, the configuration of the fluctuation restriction unit 7 will be described.

Turning to FIG. 3, the fluctuation restriction unit 7 has (i) a rotor acceleration detection unit 11 for detecting the acceleration (hereinafter referred to as "detected acceleration") of the rotor based on the estimated rotational speed ω^ input from the rotational speed/rotational phase estimation unit 6 (see FIG. 1); (ii) a subtracter 12 for calculating the deviation (herein referred to as "acceleration error") of a detected acceleration from a target acceleration (0); (iii) first to n-th acceleration control units Ac1 to Acn for calculating, based on the acceleration error computed by the subtracter 12, the torque command correction amount for each of N intervals (hereinafter referred to as "rotor angle intervals") into which the angle of the rotor when the rotor makes one rotation is divided; (iv) a current phase command conversion unit 14 for converting each torque command correction amount into a current phase command correction amount; and (v) a current phase command correction amount interpolation unit 15 for preparing a current phase command β* through linear interpolation of the current phase command correction amounts.

Next, the principle of the fluctuation restriction unit 7 will be explained.

In FIGS. 1 to 3, the load torque fluctuates largely according to the angle of the rotor as discussed earlier in the description of the prior art, especially in the case of rotary-type and reciprocation-type compressors. If such load torque fluctuations are present, the rotational speed (hereinafter referred to as "speed") of the rotor of the brushless motor 4 fluctuates such that it decreases as the load torque increases and increases as the load torque decreases, as shown in FIG. 2. On the other hand, the acceleration of the rotor (hereinafter referred to as "acceleration") fluctuates in an opposite manner to the load torque, that is, the acceleration decreases as the load torque increases. Since it is required that the vibration of the compressor be reduced, the output torque of the brushless motor 4 is maximized with a rotor angle which provides a great load torque and the output torque of the brushless motor 4 is reduced when the load torque is at a small level, whereby the torque can be well balanced, thereby mitigating vibration. To this end, the speed fluctuation should be reduced. It is clear that speed fluctuation can be reduced by controlling the torque so as to make the acceleration component zero. Therefore, the acceleration (i.e., detected acceleration) is firstly computed (detected) by calculating a change in the value of the input estimated rotational speed ω^ by the rotor acceleration detection unit 11. Then, an acceleration error is obtained from the deviation of the acceleration from the target acceleration 0 by the subtracter 12. Since the torque fluctuation has a certain pattern with respect to the rotational phase, control free from the influence of control delays can be performed by changing control conditions according to the rotational phase.

Specifically, when controlling the acceleration of the rotor, unless control is performed on the acceleration corresponding to a specified rotational phase, the control performance gets worse owing to control delays occurring in the acceleration control. To cope with this, the angle of the rotor when it makes one rotation is divided into a plurality of intervals (N intervals) and arithmetic operation for acceleration control is effected for every interval. This arithmetic operation is performed with the following Equation (1).

$$tr(n+1, i) = tr(n,i) - Ga \times a(i) \qquad (1)$$

where tr (n, i): inverter torque command (n=the number of rotations, i=rotor angle interval)

a (i): acceleration (i=rotor angle interval)

Ga: control gain

Herein, the angle of the rotor is divided into N rotor angle intervals and, in the first to n-th acceleration control units Ac1 to Acn, the arithmetic operation for acceleration control is performed for every rotor angle interval. As a result, each of the first to n-th acceleration control units Ac1 to Acn outputs a torque command correction amount for its corresponding rotor angle interval. Since the rotor angle interval to be controlled changes as the rotor rotates, it is necessary to switch the acceleration control unit which operates correspondingly to the present rotor angle interval, selecting from the units Ac1 to Acn. This switching operation is carried out based on the estimated rotational phase θ input from the rotational speed/rotational phase estimation unit 6. This torque command correction amount functions to keep the rotational speed of the brushless motor 4 constant. Further, this torque command correction amount is converted into a current phase correction amount by the current phase command conversion unit 14. If the phase of the motor current is advanced, the generated torque (output torque) of the brushless motor 4 decreases. Conversely, if the phase of the motor current is retarded, the generated torque of the brushless motor 4 increases. Thus, when the torque command correction amount is large, the current phase correction amount to be output is small and when the torque command correction amount is small, the current phase correction amount is large. In addition, it is more desirable to put a limit on this current phase correction amount. For instance, in cases where the brushless motor 4 is a salient polar motor, the phase of the motor current which allows the output torque of the motor to be maximum is present at a certain rotor angle between 0 degree and 90 degrees. With the phases of the motor current smaller and larger than this certain rotor angle, torque decreases. Therefore, the current phase correction amount is limited such that the phase of the rotor falls within the range of from the certain rotor angle to 90 degrees. If the brushless motor 4 is a non-salient polar motor, the phase of the motor current which provides the maximum output torque is 0 degree. Therefore, the current phase correction amount is limited so as to make the phase of the motor current fall within the range of from 0 degree to 90 degrees.

In addition, since the actual rotor angle is continuous, N current phase correction amounts are interpolated according to the rotor angle by the current phase command correction amount interpolation unit 15 and the value obtained from the interpolation is output as a final current phase command β*. As this rotor angle, the estimated rotational phase θ input from the rotational speed/rotational phase estimation unit 6 is used.

Figure 4:
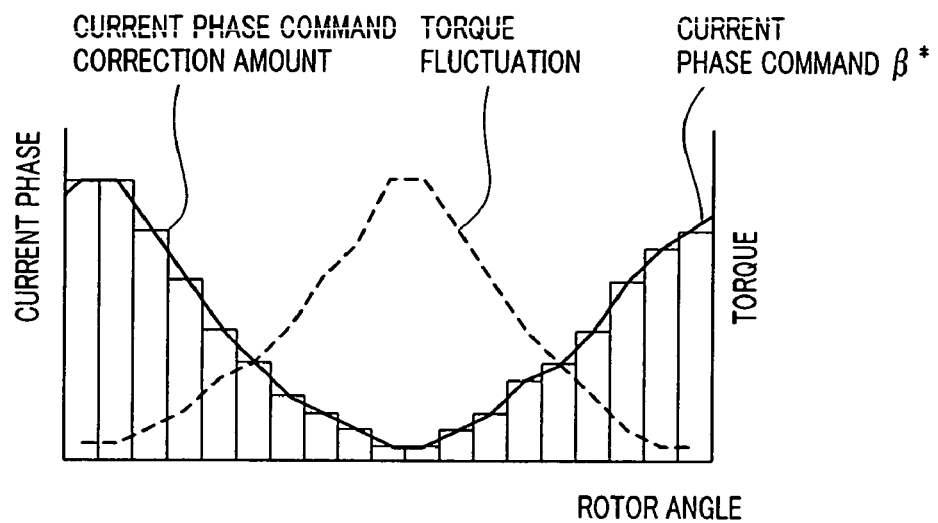
FIG. 4 is a characteristic diagram showing the relationship between torque fluctuation and an output current phase command $\beta^*$.

FIG. 4 is a characteristic diagram showing the relationship between torque fluctuation and the output current phase command β*.

Turning to FIGS. 1 to 4, the first to n-th acceleration control units Ac1 to Acn output N current phase correction amounts per rotation. The N current phase correction amounts are interpolated by the current phase command correction amount interpolation unit 15 and the value obtained from the interpolation is output as a current phase command β*.

As this interpolation, the linear interpolation is employed herein.

As shown in FIG. 4, the current phase command β* varies relative to the rotor angle such that it becomes smaller as the load torque is greater and it becomes greater as the load torque is smaller. Roughly speaking, the current phase command β* varies so as to have a phase substantially opposite to that of the load torque. Thereby, the output torque of the brushless motor 4 varies relative to the rotor angle, correspondingly to fluctuations in the load torque.

Next, there will be explained a driving circuit for the brushless motor and the operation of the motor controller.

Figure 5:
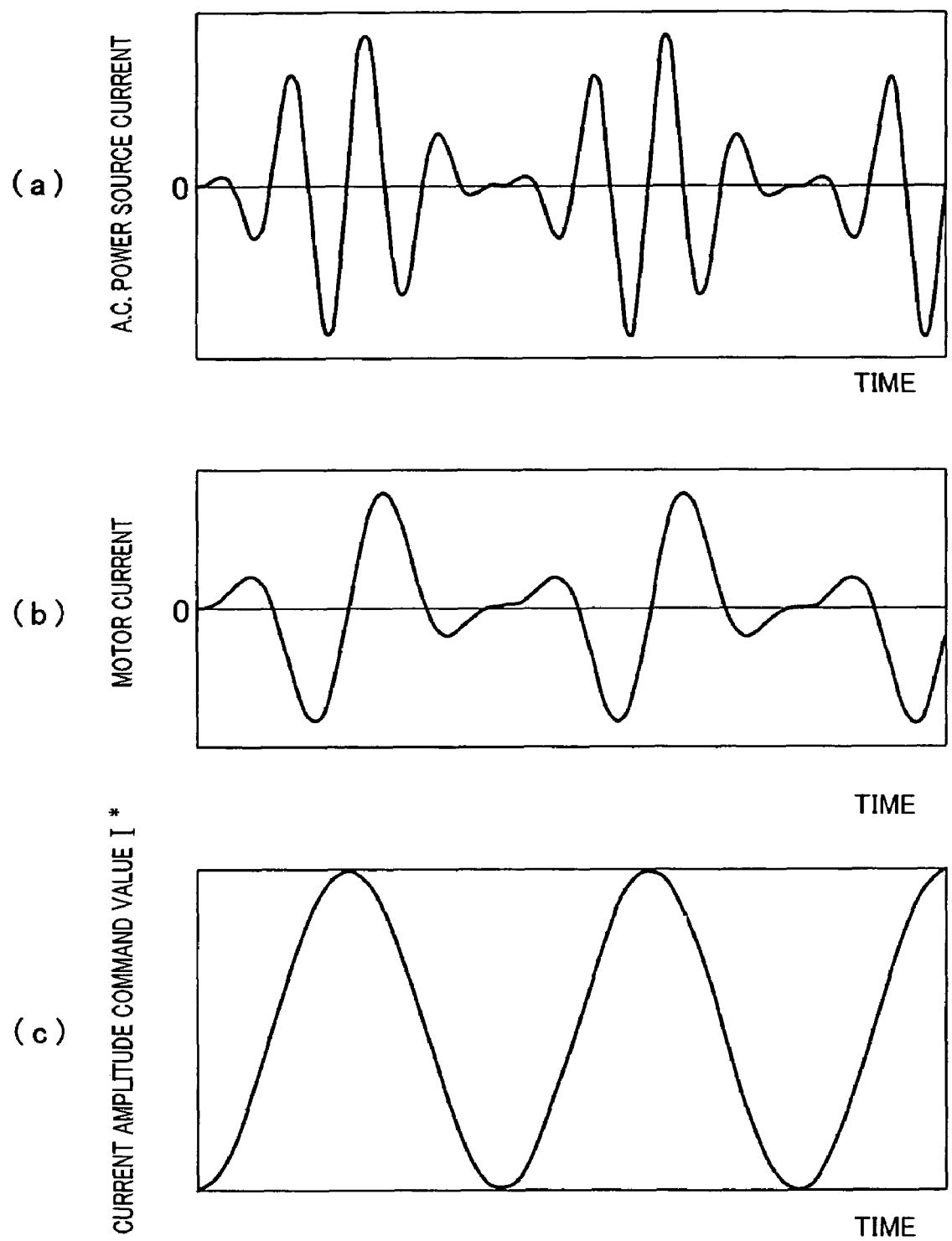
Figure 6:
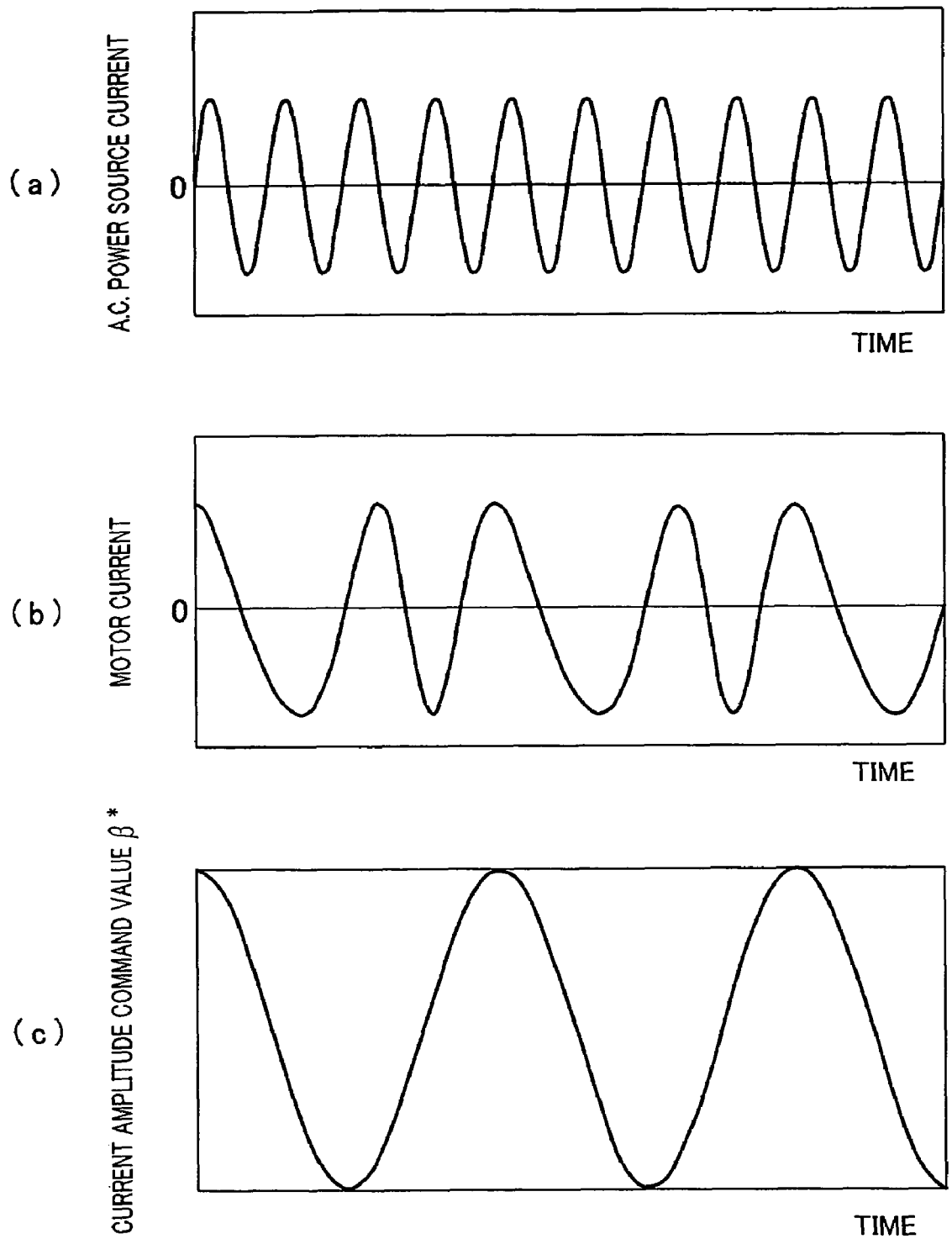

FIG. 5 is waveform charts when a smoothing capacitor is omitted from the second prior art, wherein FIG. 5(a) shows a waveform of an a.c. power source current, FIG. 5(b) shows a waveform of a motor current, and FIG. 5(c) shows a waveform of the current amplitude command I*. FIG. 6 is waveform charts associated with the first embodiment, wherein FIG. 6(a) shows a waveform of an a.c. power source current, FIG. 6(b) shows a waveform of a motor current, and FIG. 6(c) shows a waveform of the current phase command β*.

In FIGS. 1 to 4, an a.c. voltage output from the a.c. power source 1 is rectified by the rectifier circuit 2 to produce a pulsating d.c. voltage which is, in turn, supplied to the inverter circuit 3. FIG. 9(a) shows one example (a full-wave rectified waveform) of the pulsating d.c. voltage. The inverter circuit 3 converts the pulsating d.c. power into an a.c. power and applies a voltage determined by the control unit 5 to the brushless motor 4, thereby driving the brushless motor 4. At that time, the load torque of the brushless motor 4 fluctuates so as to have one peak per rotation of the rotor as shown in FIG. 4. Based on the motor current of the brushless motor 4 detected by the current sensor 102, the control unit 5 prepares the current phase command β* which varies in a sinusoidal pattern as shown in FIG. 6(c) and has a phase substantially opposite to the phase of the load torque. The control unit 5 drivingly controls the inverter circuit 3 based on this current phase command β*. Thereby, the phase of the motor current of the brushless motor 4 varies as shown in FIG. 6(b) as the rotor rotates, so that the output torque of the brushless motor 4 corresponds to the fluctuation of the load torque. As a result, the vibration caused by the speed fluctuation which the load fluctuation entails can be reduced. Since the amplitude of the motor current at that time is constant as shown in FIG. 6(b), the amplitude of the current output from the a.c. power source 1 does not vary as seen from FIG. 6(a) even if a motor controller having no high-capacity smoothing capacitor is used (the motor controller of the present embodiment does not use a smoothing capacitor itself) and, in consequence, the power factor does not drop. Accordingly, the vibration prevention control does not adversely affect the business distribution line system.

In contrast with this, in the case where the second prior art from which the smoothing capacitor is eliminated is applied to a compressor, the amplitude of the motor current varies as shown in FIG. 5(b), and according to this, the amplitude of the current output from the a.c. power source 1 varies as shown in FIG. 5(a), resulting in a drop in the power factor. Therefore, it adversely affects the business distribution line system.

As described above, the first embodiment enables it to mitigate vibration attributable to the load torque fluctuation without causing a drop in the power factor and without adversely affecting the business distribution line system.

While the above description has been presented in terms of a case where the load torque fluctuates with a peak per rotation of the rotor, the invention is equally applicable to cases where the load torque varies in other arbitrary patterns.

While the current phase command is prepared based on acceleration by the fluctuation restriction unit 7 in the above description, it is readily apparent that the same effect could be attained with preparation of the current phase command based on, for instance, speed.

While the inverter circuit 3 is constituted by a voltage-type inverter in the above description, it could be constituted by a current-type inverter.

Second Embodiment

Figure 7:
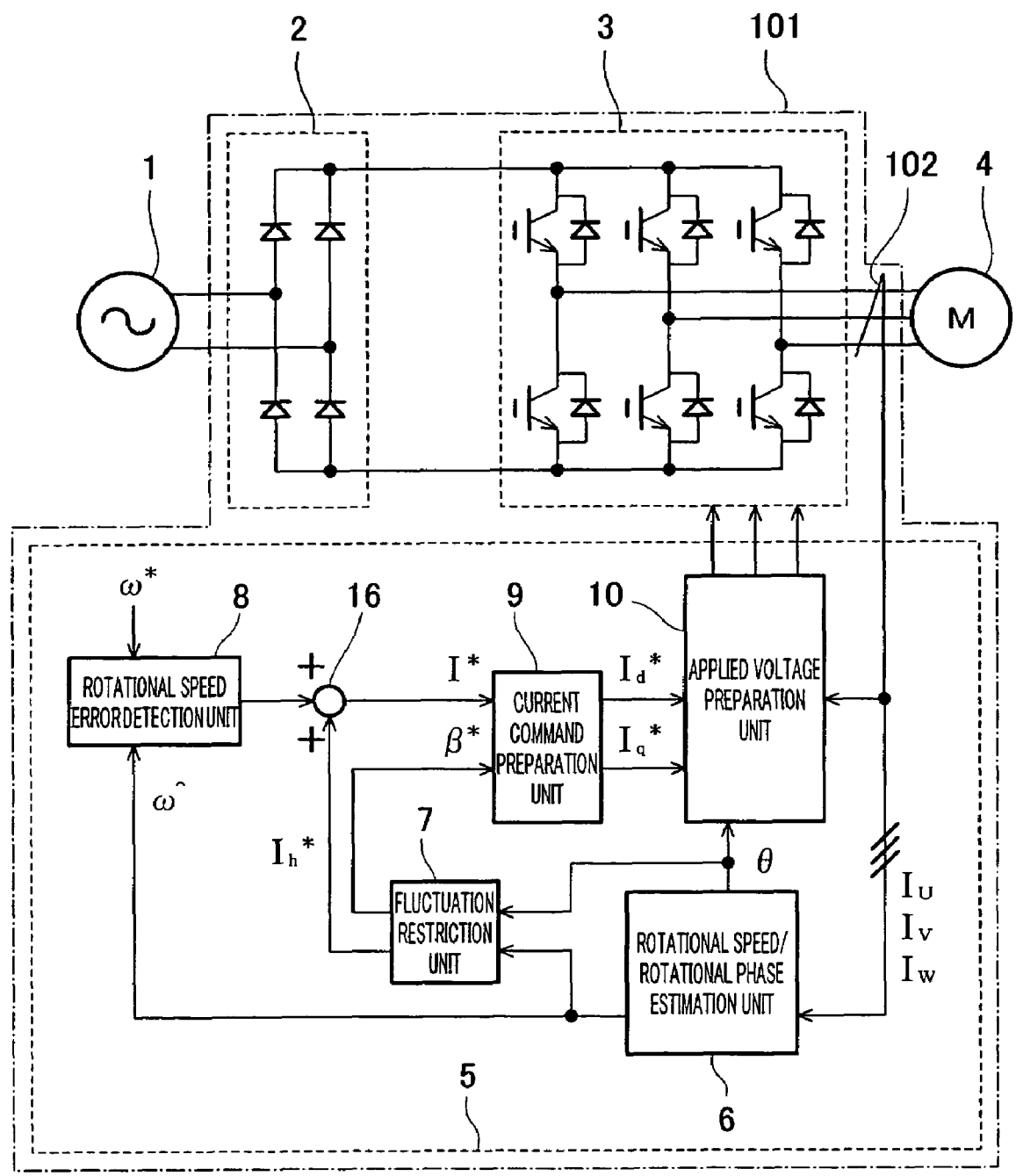
FIG. 7 is a block diagram showing a configuration of a motor controller according to a second embodiment of the invention.

FIG. 7 is a block diagram showing a configuration of a motor controller constructed according to a second embodiment of the invention. In FIG. 7, corresponding or identical parts are once again indicated with the same reference numerals as in FIG. 1. In the second embodiment, the control unit 5 has an adder 16 as shown in FIG. 7. The fluctuation restriction unit 7 further outputs a current amplitude correction command $I_h^*$. The adder 16 adds the output of the rotational speed error detection unit 8 to the current amplitude correction command $I_h^*$ to output to the current command preparation unit 9. In terms of other features, the second embodiment does not differ from the first embodiment.

For speed fluctuation control, the fluctuation restriction unit 7 prepares the current phase command β* and the current amplitude command correction value $I_h^*$ based on, for example, the estimated rotational speed ω^ and estimated rotational phase θ which have been input. The torque correction amount may be obtained in the same way as in the first embodiment, and based on the result, the current phase command β* and the current amplitude command correction value $I_h^*$ are determined. As explained earlier in the first embodiment, for reducing the output torque of the blushless motor 4 (hereinafter referred to as "output torque"), the current phase command β* may be increased or the current amplitude value may be reduced. For increasing the output torque, the current phase command β* may be reduced or the current amplitude value may be increased. It is free to decide which way will be chosen. The range of the current amplitude command correction value $I_h^*$ may be set in compliance with the desired value of the power factor. For instance, if the desired value of the power factor is 0.9 or more, it is advisable to set the current amplitude command correction value $I_h^*$ such that the maximum/minimum ratio of the current amplitude command I* during the period when the rotor makes one rotation becomes about 0.3 or more. If the desired value of the power factor is 0.95 or more, it is advisable to set the current amplitude command correction value $I_h^*$ such that the maximum/minimum ratio of the current amplitude command I* becomes about 0.5 or more. Thus, the possible range of the current amplitude command correction value $I_h^*$ is set according to the desired value of the power factor and the current amplitude command I* is determined. If the vibration control in this condition turns out to be unsatisfactory, vibration can be restricted by increasing or reducing the current phase command β*.

As described above, the second embodiment can provide a motor controller having a higher degree of freedom, because the fluctuation restriction unit 7 releases the current amplitude command correction value $I_h^*$ and the current phase command β* which restrict speed fluctuations. In addition, the second embodiment can provide a motor controller operable with a desired power factor.

Third Embodiment

Figure 8:
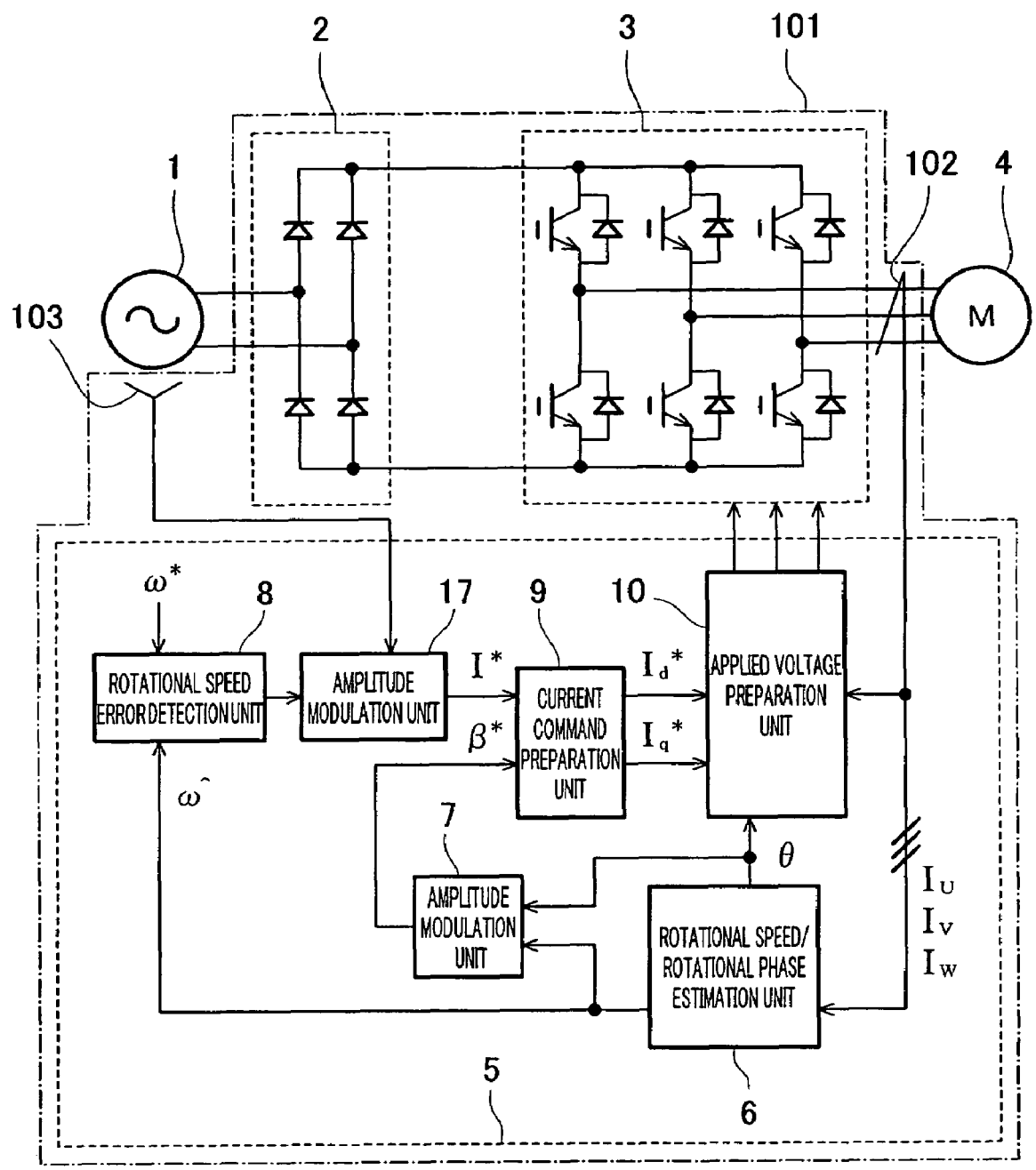
FIG. 8 is a block diagram showing a configuration of a motor controller according to a third embodiment of the invention.
Figure 9:
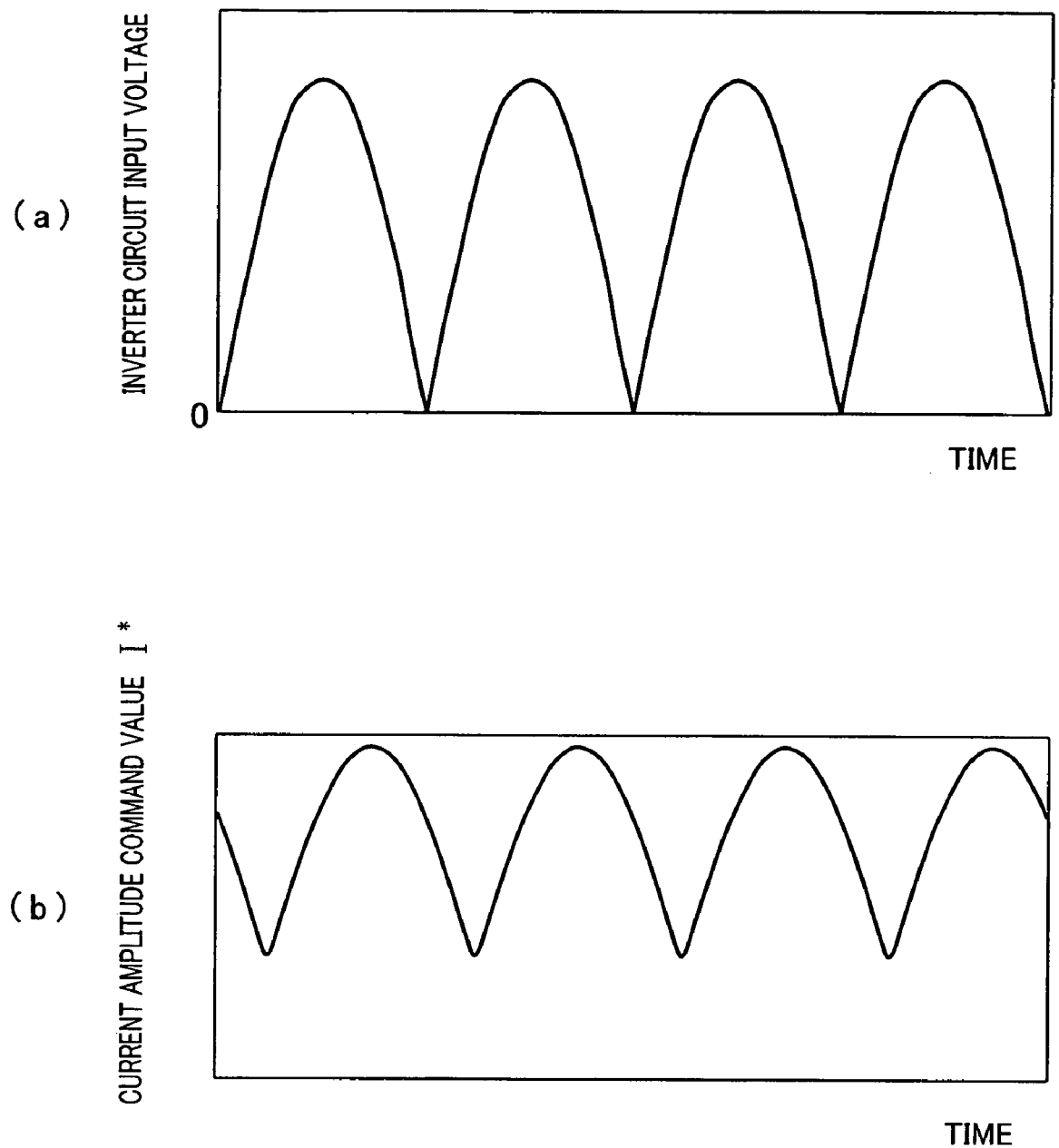

FIG. 8 is a block diagram showing a configuration of a motor controller according to a third embodiment of the invention. FIG. 9 is waveforms associated with the third embodiment, wherein FIG. 9(a) shows a waveform of the input voltage of an inverter circuit and FIG. 9(b) shows a waveform of the current amplitude command I*. In FIG. 8, the parts corresponding to or identical with those of FIG. 1 are identified by the same reference numerals.

In the third embodiment, the motor controller 101 further includes a voltage sensor 103 for detecting the output voltage of the a.c. power source 1, and the control unit 5 further includes an amplitude modulation unit 17 for modulating the output of the rotational speed fluctuation detection unit 8 based on the phase of the voltage detected by the voltage sensor 103 to output to the current command preparation unit 9 as the current amplitude command I*. In terms of other features, the third embodiment does not differ from the first embodiment.

Concretely, the voltage (input voltage) to be applied to the inverter circuit 3 pulsates as shown in FIG. 9 (a). The input voltage of the inverter circuit 3 fluctuates according to changes in the absolute value of the output voltage of the a.c. power source 1. When the absolute value of the output voltage is great, the input voltage of the inverter circuit 3 is high and therefore a current easily flows in the brushless motor 4. In cases where a small-capacity capacitor (not shown) is placed between the inverter circuit 3 and the rectifier circuit 2, a charge current for the capacitor is generated when the output voltage of the a.c. power source (more precisely, the rectifier circuit 2) becomes higher than the voltage of the capacitor.

The amplitude modulation unit 17 is designed to modulate the output of the rotational speed fluctuation detection unit 8 based on the voltage phase of the a.c. power source detected by the voltage sensor 103 in order to prepare the current amplitude command I* with which, as shown in FIG. 9(b), the current flowing in the brushless motor 4 becomes small during the period when the absolute value of the output voltage of the a.c. power source 1 increases and becomes great during the period when the absolute value of the output voltage of the a.c. power source 1 drops. The amplitude modulation unit 17 outputs the command I* to the current command preparation unit 9. As a result, the fluctuating frequency of the current amplitude command I* becomes twice the frequency of the a.c. power source 1.

By virtue of this arrangement, the current flowing from the a.c. power source 1 becomes smoother, resulting in an improved power factor. Although the third embodiment has been discussed in terms of a case where the first embodiment is modified, the second embodiment may be similarly modified. In this case, the output of the amplitude modulation unit 17 shown in FIG. 8 may be input to the adder 16 shown in FIG. 2.

Fourth Embodiment

Figure 10:
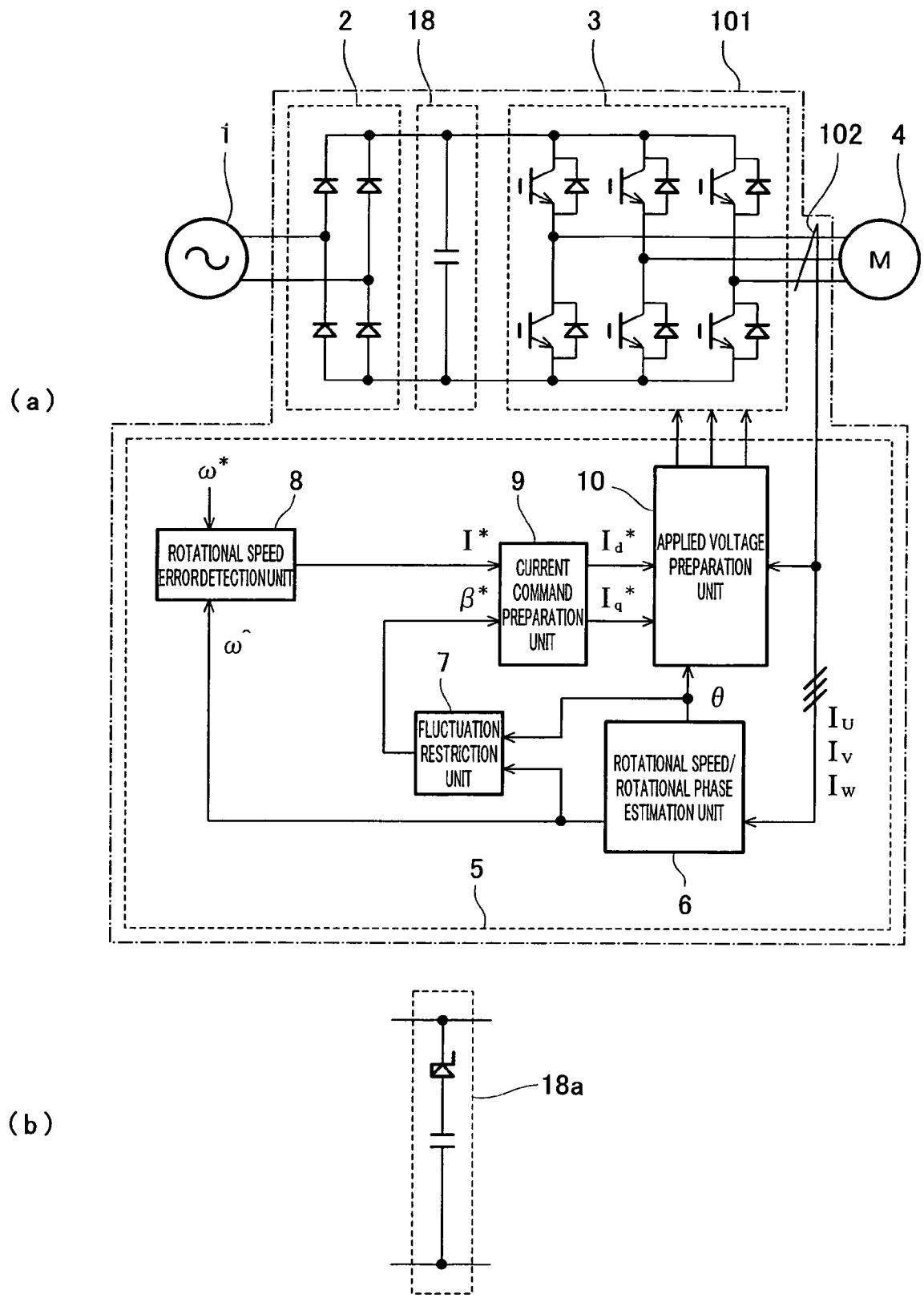
FIG. 10 is block diagrams showing a configuration of a motor controller according to a fourth embodiment of the invention.

FIG. 10(a) is a block diagram showing a configuration of a motor controller constructed according to a fourth embodiment of the invention. In FIG. 10(a), the parts corresponding to or identical with those of FIG. 1 are identified by the same reference numerals.

In the fourth embodiment, the motor controller 101 further includes a charging/discharging circuit 18 disposed between the rectifier circuit 2 and the inverter circuit 3.

The charging/discharging circuit 18 is constituted by a capacitor connected between the output terminals of the rectifier circuit 2.

With this arrangement, if the output voltage of the rectifier circuit 2 exceeds the voltage held by the capacitor, charging of the capacitor starts. This charging is constantly done when the pulsating output voltage of the rectifier circuit 2 is higher than the voltage held by the capacitor. When the output voltage of the rectifier circuit 2 is lower, the capacitor is discharged. If the motor controller 101 does not have the charging/discharging circuit 18, the minimum of the input voltage of the inverter circuit 3 becomes approximately 0 V as shown in FIG. 9 (a). Therefore, the capacitor of the charging/discharging circuit 18 is completely discharged in synchronization with the output voltage of the a.c. power source 1 at a frequency which is one-half of the frequency of the output voltage. Since discharging is invariably carried out at a frequency that is one-half of the output voltage of the a.c. power source 1, whenever the output voltage of the a.c. power source is high, a current for charging flows so that the flow rate of current from the a.c. power source 1 increases. As a result, the period of electric conduction prolongs, leading to an improved power factor. In addition, vibration can be mitigated without causing a drop in the power factor even when high-load operation is carried out. Further, the electric capacitance C[F] of the capacitor of the charging/discharging circuit 18 may be higher than 0[F] and no more than $2 \times 10^{-7} \times P[F]$ where the power consumption of the brushless motor 4 is represented by P[W].

Although the fourth embodiment has been discussed in terms of a case where the first embodiment is modified, it is readily apparent that the same effect can be attained by similar modification of the second or third embodiment.

The charging/discharging circuit 18 may be replaced with a charging/discharging circuit 18a composed of a Zener diode and a capacitor which are interconnected in series as shown in FIG. 10(b). This arrangement does not differ from the charging/discharging circuit shown in FIG. 10(a) except that charging of the capacitor starts when the output voltage of the rectifier circuit 2 exceeds the sum of the voltage held by the capacitor and the yield voltage of the Zener diode. In this arrangement, current flows in the same manner as described above and the effect of improving the power factor can be achieved like the above-described case. If it is desired that the incoming current (the first current flowing at an instant charging of the capacitor is started) flowing into the Zener diode be reduced, a resistor (not shown) may be serially connected in addition to the Zener diode and the capacitor. The electric capacitance of the capacitor of the charging/discharging circuit 18a may be approximately the same as that of the charging/discharging circuit 18.

Obviously, provision of an inductor inserted between the a.c. power source 1 and the rectifier circuit 2 will bring about a further improved power factor that the higher harmonic component of the current is restricted (not shown). The inductance L[H] of this inductor may be more than 0[H] and no more than $9 \times 10^{-9} \times C[H]$, where the electric capacitance of the capacitor is represented by C[F].

Fifth Embodiment

Figure 11:
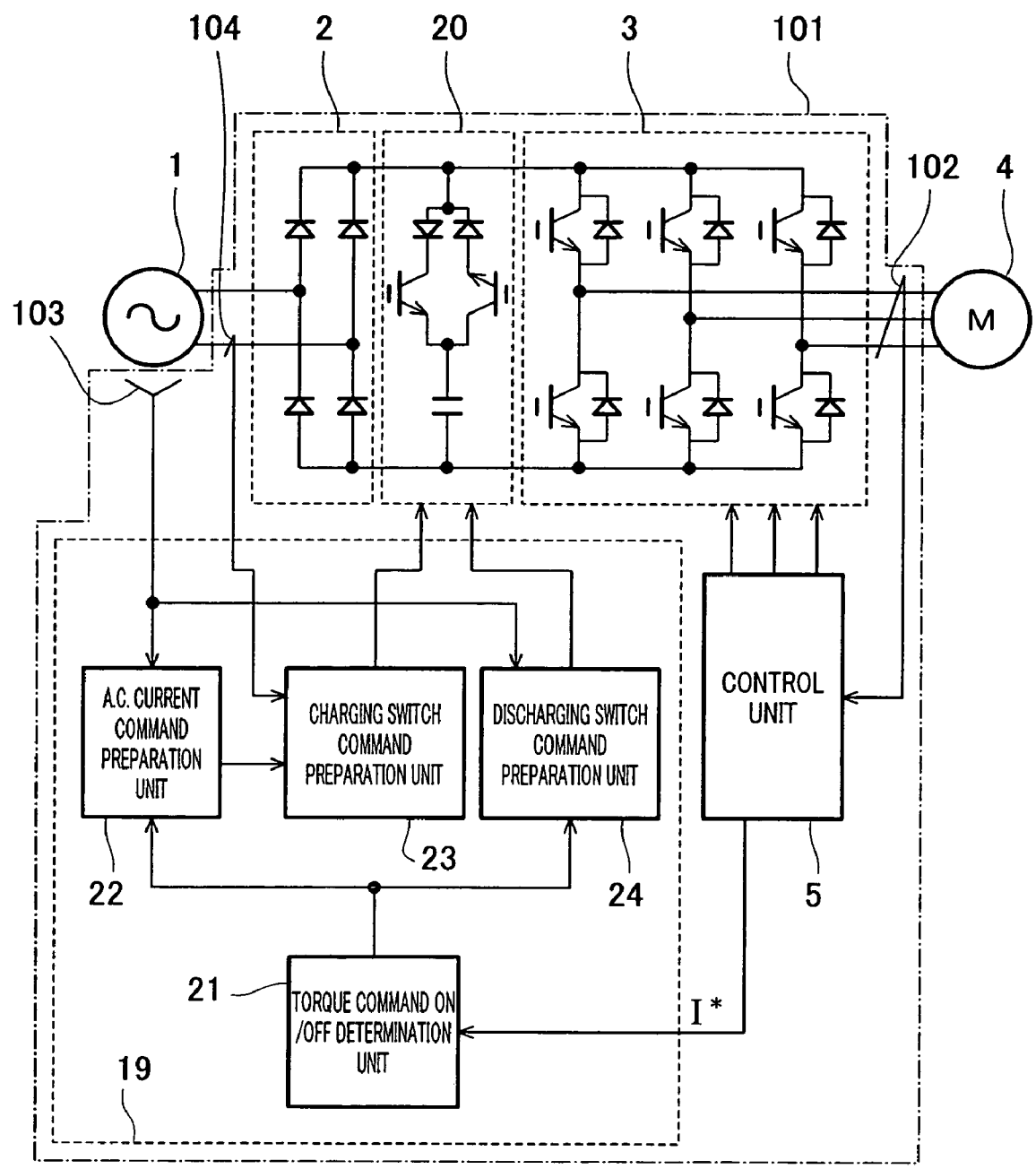
FIG. 11 is a block diagram showing a configuration of a motor controller according to a fifth embodiment of the invention.

FIG. 11 is a block diagram showing a configuration of a motor controller according to a fifth embodiment of the invention. In FIG. 11, the parts corresponding to or identical with those of FIG. 1 are identified by the same reference numerals.

The motor controller 101 of the fifth embodiment further includes a charging/discharging circuit control unit 19, a charging/discharging circuit 20, the voltage sensor 103 and a current sensor 104. With regard to other features, the fifth embodiment does not differ from the first embodiment.

The charging/discharging circuit 20 is composed of a two-way switch and a capacitor which are interconnected in series between the output terminals of the rectifier circuit 2. The two-way switch serves as a charging switch and discharging switch. The charging/discharging circuit control unit 19 includes a torque command on/off determination unit 21, an a.c. current command preparation unit 22, a charging switch command preparation unit 23 and a discharging switch command preparation unit 24.

The torque command on/off determination unit 21 determines in response to the current amplitude command I* from the control unit 5 whether or not the current amplitude command value to be given to the brushless motor 4 is large or small. The way of determination is such that the average of the current amplitude commands I* issued when the rotor makes one rotation (hereinafter referred to as "the average current amplitude command value") is obtained and it is then determined whether the present current amplitude command I* (hereinafter referred to as "the present current amplitude command value") is larger or smaller than the average current amplitude command value. The result of the determination is output to the a.c. current command preparation unit 22.

The a.c. current command preparation unit 22 detects the voltage phase of the a.c. power source 1 through the voltage sensor 103 and prepares an a.c current command Iac* based on the result of the determination made by the torque command on/off determination unit 21. During the period that it is judged in the above determination that the present current amplitude command value is smaller than the average current amplitude command value (hereinafter referred to as "the period 1"), the a.c. current command Iac* is prepared based on the voltage phase of the a.c. power source 1. During the period that the present current amplitude command value is determined to be larger than the average current amplitude command value (hereinafter referred to as "the period 2"), outputting of the a.c. current command Iac* is stopped. During the period 1, since the value of the voltage applied to the brushless motor 4 by the inverter circuit 3 is small, the motor current is small. Therefore, most of the current incoming from the a.c. power source 1 (hereinafter referred to as "a.c. power source current") is used for charging the capacitor of the charging/discharging circuit 20.

The a.c. current command Iac* is prepared so as to limit the amplitude value of the a.c. power source current such that the voltage of the capacitor does not become overvoltage in the period 1. The a.c. current command Iac* thus prepared is input to the charging switch command preparation unit 23. The charging switch command preparation unit 23 performs feedback control to make the value of the a.c. power source current detected by the current sensor 104 equal to the a.c. current command Iac*. The feedback control is carried out through the PWM operation of the charging switch of the charging/discharging circuit 20. Although the PI control is generally utilized for the feedback algorithm used herein, the feedback algorithm is not limited to this.

During the period 2, the a.c. current command Iac* is not input to the charging switch command preparation unit 23 and therefore the charging switch is stopped.

During the period 2, the value of the voltage applied to the brushless motor 4 by the inverter circuit 3 is large so that the motor current is large. Therefore, the a.c. power source current is large. However, when the output voltage of the a.c. power source 1 is low, it becomes difficult to apply a desired voltage to the brushless motor 4. To solve this problem, the discharging switch command preparation unit 24 turns the discharging switch of the charging/discharging circuit 20 ON, thereby applying a desired voltage to the brushless motor 4 and, at the same time, allowing the capacitor to be charged during the next period 1. The discharging switch command preparation unit 24 determines a timing for turning the discharging switch ON, based on the voltage phase of the a.c. power source 1 detected by the voltage sensor 103.

The operation described above is continuously performed whenever the brushless motor 4 makes one rotation, so that the power factor of the a.c. power source 1 can be increased.

It should be noted that the control unit 5 may be constituted by the control unit of the second prior art which restricts vibration by controlling the amplitude of the motor current.

Sixth Embodiment

Figure 12:
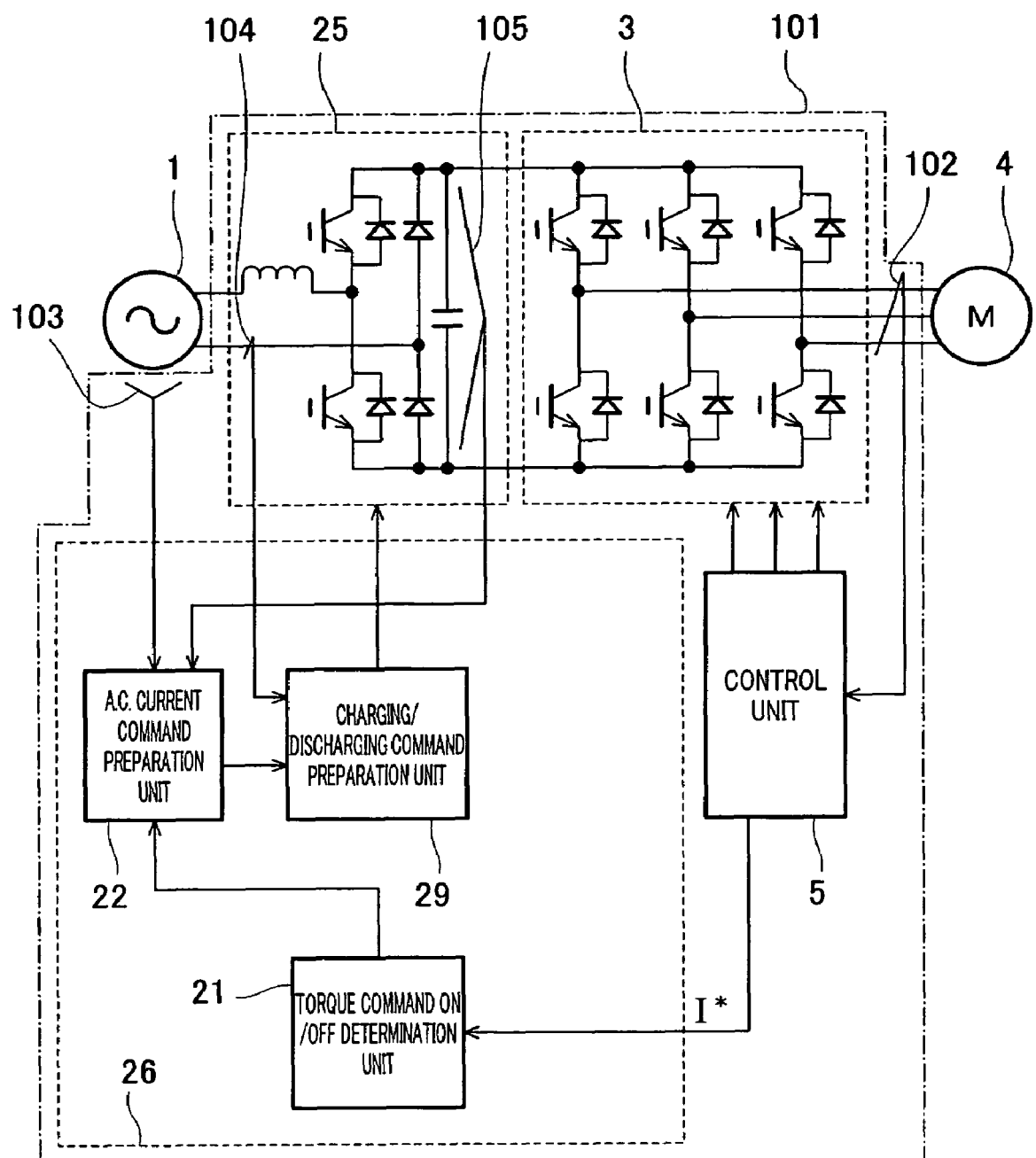
FIG. 12 is a block diagram showing a configuration of a motor controller according to a sixth embodiment of the invention.
Figure 13:
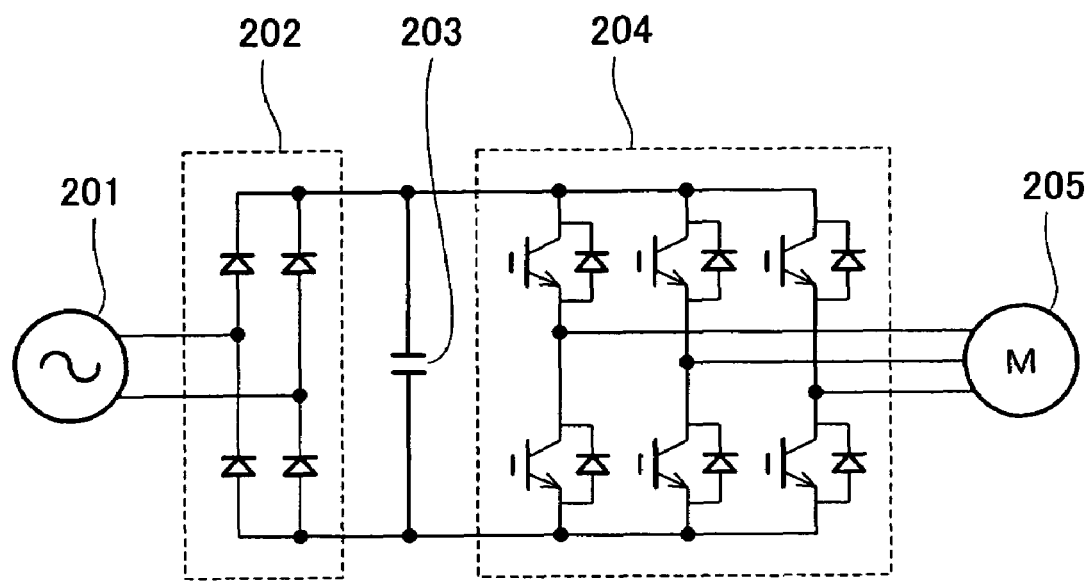
FIG. 13 is a block diagram showing a configuration of a first prior art motor controller.
Figure 14:
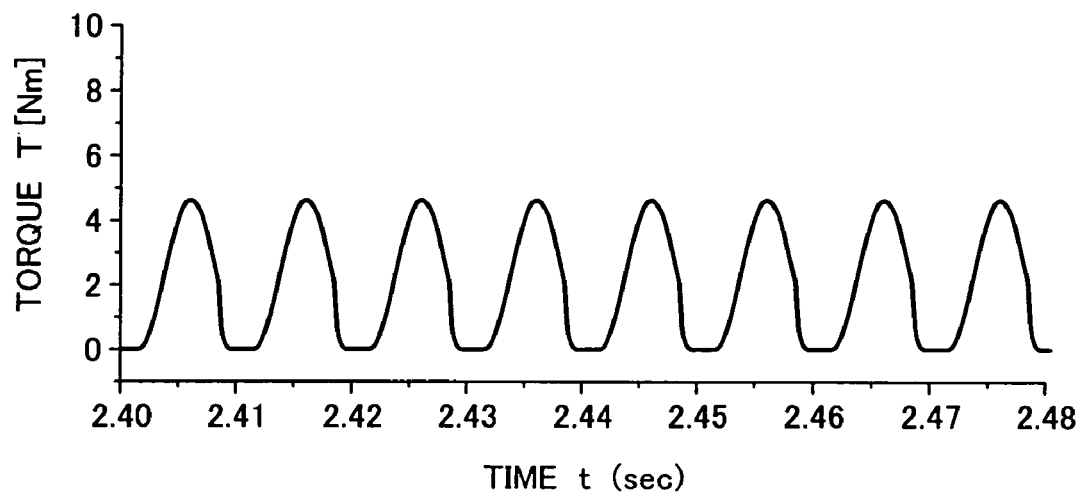
FIG. 14 is a graph showing one example of a torque command for the first prior art motor controller and one example of the voltage and current of an a.c. power source.
Figure 14:
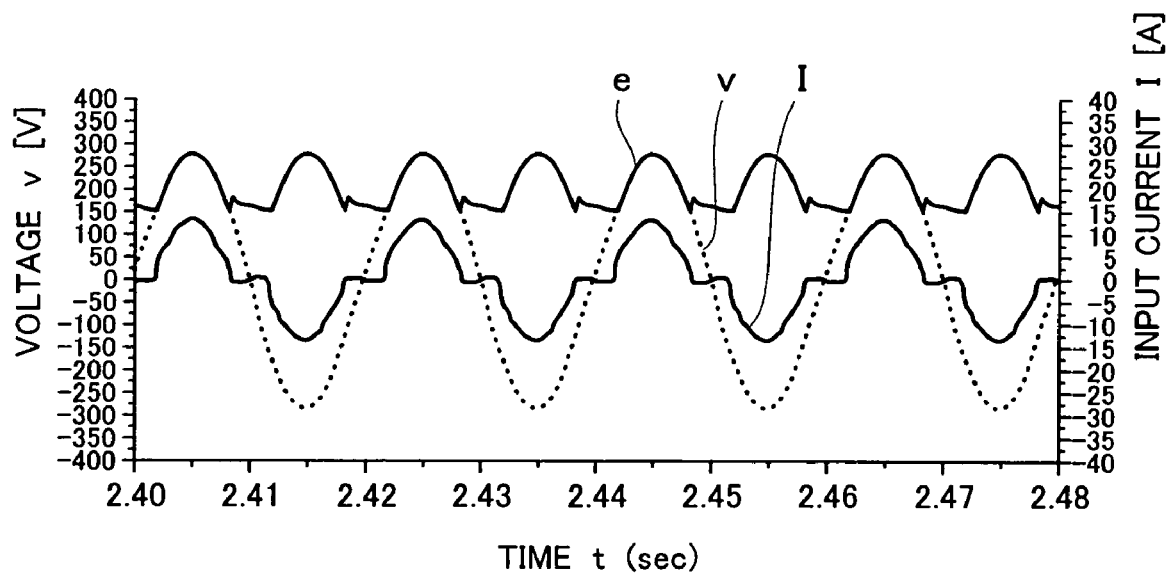
Figure 15:
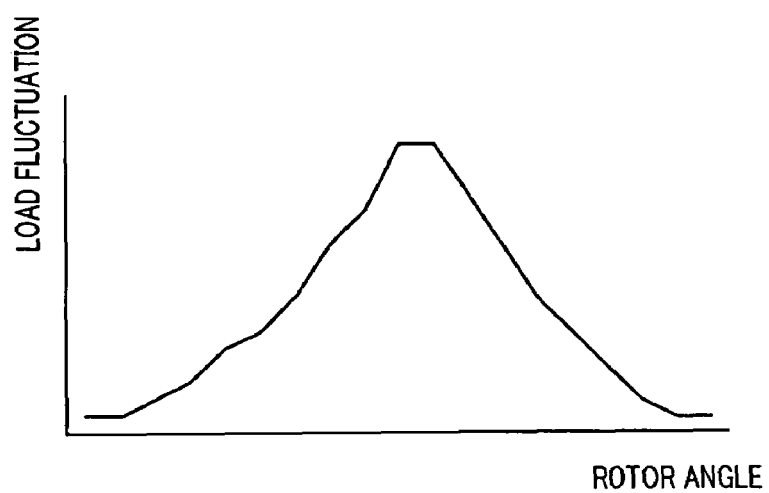
FIG. 15 is a characteristic diagram showing one example of load torque fluctuation in a conventional rotary-type compressor.

FIG. 12 is a block diagram showing a configuration of a motor controller according to a sixth embodiment of the invention. In FIG. 12, the parts corresponding to or identical with those of FIG. 11 are identified by the same reference numerals.

In the sixth embodiment, there are provided a converter circuit 25 and a converter circuit control unit 26, as shown in FIG. 12, in place of the charging/discharging circuit 20 and charging/discharging circuit control unit 21 of the fifth embodiment (FIG. 11). The motor controller of the sixth embodiment further includes a voltage sensor 105. Except the above points, the sixth embodiment does not differ from the fifth embodiment.

The converter circuit 25 consists of a known circuit having an inductor, a switching element, a diode and a capacitor.

The converter circuit control unit 26 has the torque command on/off determination unit 21, the a.c. current command preparation unit 22, and a charging/discharging command preparation unit 29.

The torque command on/off determination unit 21 is the same as that of the fifth embodiment. An a.c. current command preparation unit 28 detects the voltage phase of the a.c. power source 1 through the voltage sensor 103 and prepares a sinusoidal a.c. current command. The charging/discharging command preparation unit 29 detects the a.c. power source current through the current sensor 104 and feedback controls the a.c. power source current such that it meets the a.c. current command. This feedback control is carried out in such a way that the charging/discharging command preparation unit 29 outputs a PWM control signal to the switching element of the converter circuit 25 and the switching element is switched according to the PWM signal. Although the PI control is generally employed as the feedback control, the feedback control is not limited to this.

The a.c. current command preparation unit 28 prepares a.c. current commands having different amplitude values depending on the period 1 and the period 2. In the period 1, since the motor current of the brushless motor 4 is made small, little current flows into the inverter circuit 3. Therefore, the capacitor of the converter circuit 25 is charged with current based on the a.c. current command. On the other hand, in the period 2, current flows into the brushless motor 4 by way of the inverter circuit 3, so that power is supplied from the a.c. power source 1 at the same time that the charged capacitor is discharged. Therefore, the amplitude value of the a.c. current command is reduced in the period 1, whereas the amplitude value of the a.c. current command is increased in the period 2. It should be noted that the ratio of the amplitude value of the a.c. current command in the period 2 to the amplitude value in the period 1 may be set to 0.3 or more if the desirable power factor is 0.9 and set to 0.5 or more if the desirable power factor is 0.95. However, it is necessary to make the charging amount and discharging amount of the capacitor when the brushless motor 4 rotates once equal to each other, and therefore the a.c. current command preparation unit 22 detects the hold voltage of the capacitor through the voltage sensor 105 and adjusts the amplitude value of the a.c. current command based on it.

Seventh Embodiment

According to a seventh embodiment of the invention, there will be explained a compressor to which the motor controller of any of the first to sixth embodiments is applied.

Figure 16:
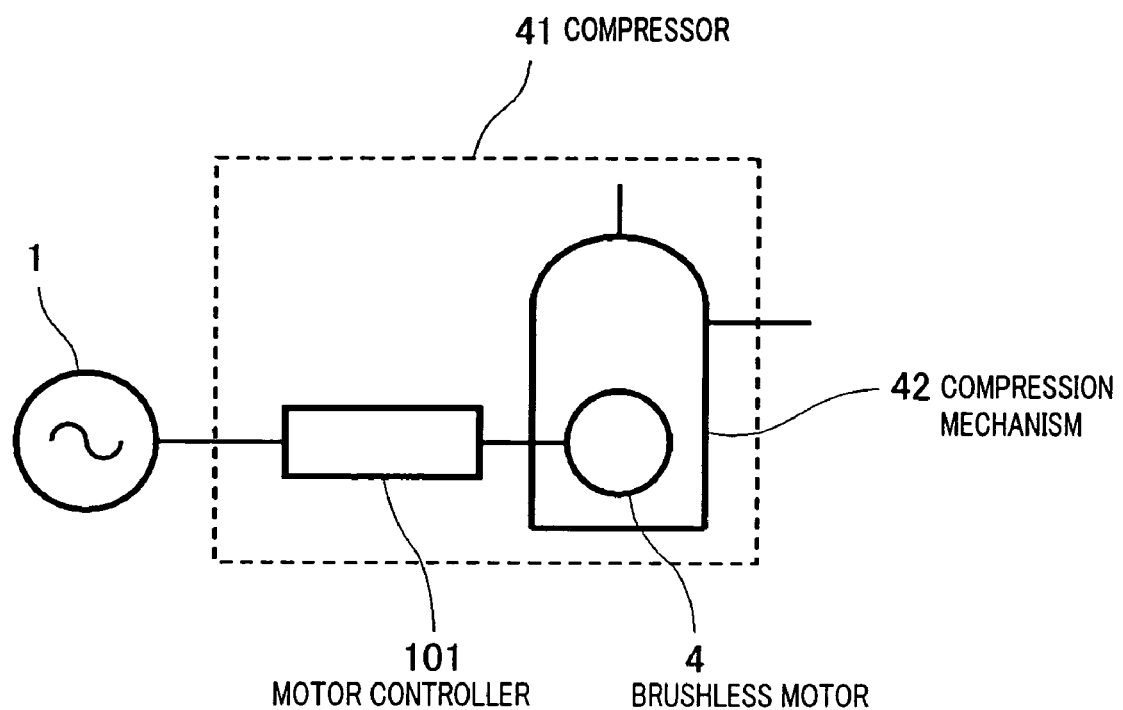
FIG. 16 is a block diagram showing a configuration of a compressor according to a seventh embodiment of the invention.

FIG. 16 is a block diagram showing a configuration of a compressor 41 according to the seventh embodiment of the invention.

In FIG. 16, the compressor 41 connected to the a.c. power source 1 has the motor controller 101 and a compression mechanism 42 driven by the brushless motor 4. The brushless motor 4 and a.c. power source 1 of the seventh embodiment are configured and function similarly to those of the first embodiment. The motor controller 101 consists of the motor controller of any of the first to sixth embodiments described earlier. The output of the motor controller 101 is input to the brushless motor 4 disposed in the compression mechanism 42 and the brushless motor 4 is rotatively driven by the motor controller 101. The rotation of the brushless motor 4 allows the compression mechanism 42 to compress a suctioned refrigerant and discharge it as a high-pressure refrigerant.

The compression mechanism 42 is a rotary type or reciprocation type mechanism and imparts load fluctuations to the brushless motor 4, the load fluctuations being synchronous with the rotation of the brushless motor 4. By use of the motor controller of any of the first to sixth embodiments, the speed fluctuation of the brushless motor 4 is restricted so that a compressor having less vibration and a high power factor can be achieved. In addition, since a high-capacity inductor and capacitor are eliminated, the invention can provide a compact, light-weight compressor.

Eighth Embodiment

According to an eighth embodiment of the invention, there will be explained an air conditioner to which the motor controller of any of the first to sixth embodiments is applied.

Figure 17:
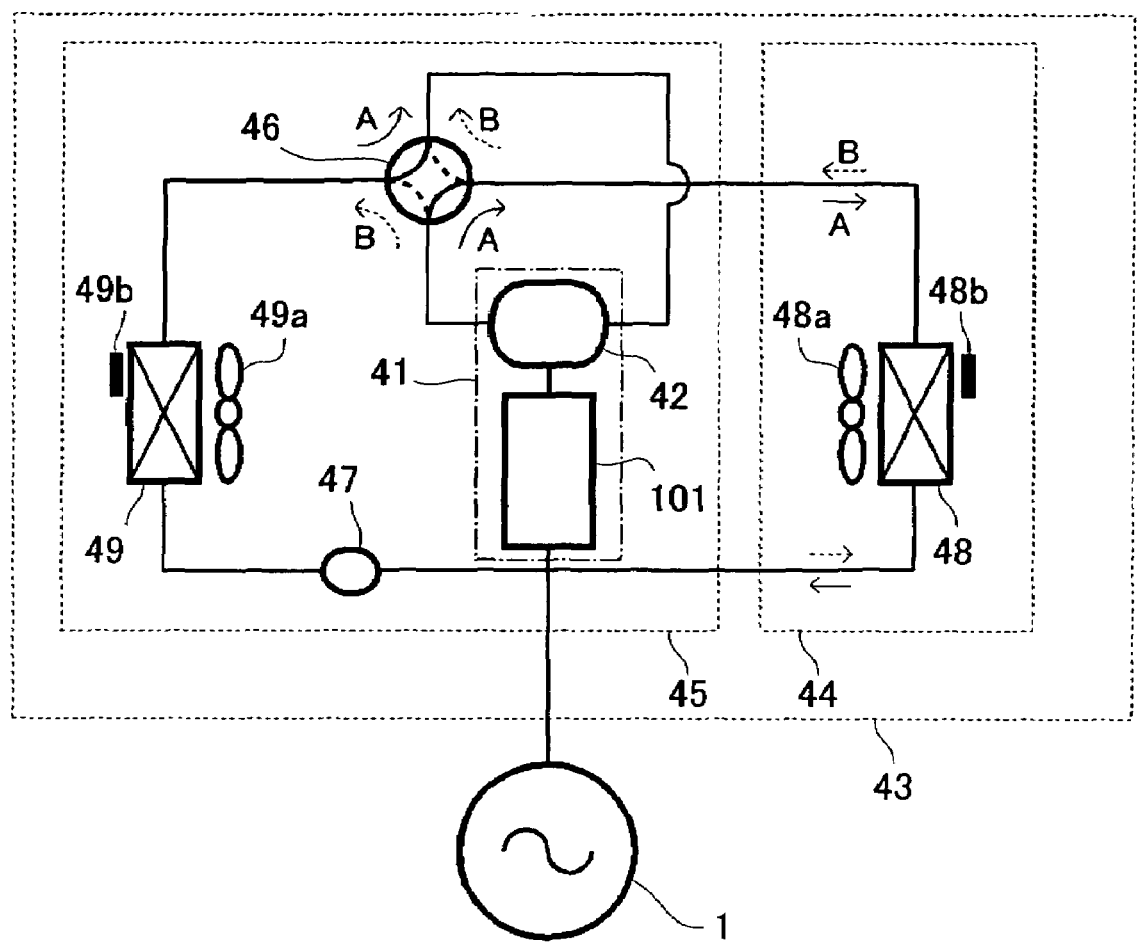
FIG. 17 is a block diagram showing a configuration of an air conditioner according to an eighth embodiment of the invention.

FIG. 17 is a block diagram showing a configuration of an air conditioner 43 according to the eighth embodiment of the invention.

In FIG. 17, the air conditioner 43 of the eighth embodiment has an indoor unit 44 and outdoor unit 45 by which cooling (and heating) of the room is carried out. The outdoor unit 45 has the compressor 41 which consists of the compressor of the seventh embodiment having the compression mechanism 42 and the motor controller 101. The motor controller 101 is connected to the a.c. power source 1. As described earlier, the compression mechanism 42 is driven by a brushless motor (not shown in FIG. 17) disposed therein and the brushless motor is controlled by the motor controller 101. The brushless motor and the a.c. power source 1 are configured and function similarly to those of the first embodiment. The motor controller 101 consists of the motor controller of any of the first to sixth embodiments.

The compression mechanism 42 allows the refrigerant to circulate between the indoor unit 44 and the outdoor unit 45.

The indoor unit 44 has an indoor heat exchanger 48 interposed in a circulation path for the refrigerant (hereinafter referred to as "refrigerant circulation path"). The indoor heat exchanger 48 includes a fan 48a for increasing the heat exchange ability of the indoor heat exchanger 48 and a temperature sensor 48b for measuring the temperature of the indoor heat exchanger 48 or its ambient temperature.

The outdoor unit 45 has, in addition to the compressor 41, a four-way valve 46 interposed in the refrigerant circulation path, a throttle system 47, and an outdoor heat exchanger 49. The outdoor heat exchanger 49 includes a fan 49a for increasing the heat exchange ability of the indoor heat exchanger 49 and a temperature sensor 49b for measuring the temperature of the indoor heat exchanger 49 or its ambient temperature.

The four-way valve 46 is switched to connect the outlet port and inlet port of the compression mechanism 42 to the refrigerant circulation path. By switching the four-way valve 46, the flowing direction of the refrigerant within the refrigerant circulation path can be changed. For instance, if the flowing direction of the refrigerant which flows in the refrigerant circulation path of the air conditioner 43 is switched to the direction indicated by arrow A, the refrigerant which has passed through the outdoor heat exchanger 49 is suctioned by the compression mechanism 42 through the four-way valve 46, and the refrigerant discharged from the compression mechanism 42 is fed to the indoor heat exchanger 48. On the other hand, if the flowing direction of the refrigerant is changed to the direction indicated by arrow B by switching the four-way valve 46, the refrigerant which has passed through the indoor heat exchanger 48 is suctioned by the compression mechanism 42 through the four-way valve 46, and the refrigerant discharged from the compression mechanism 42 is fed to the outdoor heat exchanger 49. Thus, the flowing direction of the refrigerant is changed by switching the four-way valve 46.

The throttle system 47, which is disposed in the refrigerant circulation path for interconnecting the indoor heat exchanger 48 and the outdoor heat exchanger 49, has both the throttling function of reducing the flow rate of the circulating refrigerant and the valve function of automatically adjusting the flow rate of the refrigerant. While the refrigerant is circulating in the refrigerant circulation path, the throttle system 47 reduces the flow rate of the liquid refrigerant sent from the condenser to the evaporator to expand the liquid refrigerant immediately thereafter, and at the same time, supplies the evaporator with a necessary amount of refrigerant that is neither too much nor too little. In this air conditioner 43, the indoor heat exchanger 48 serves as a condenser in heating operation and as an evaporator in cooling operation. In the condenser, the high-temperature, high-pressure gaseous refrigerant flowing therein is gradually liquefied as it is deprived of heat by air sent in, so that it is brought into a high-pressure liquid state or a liquid-gas mixed state, in the neighborhood of the outlet of the condenser. This is equal to the liquefaction of the refrigerant accompanied with heat dissipation to the atmosphere. The refrigerant in the liquid state or the liquid-gas mixed state, which has come to have low temperature and lower pressure in the throttle system 47, flows into the evaporator. If surrounding air is sent into the evaporator in this condition, the refrigerant deprives the air of a lot of heat and evaporates to include increased gas. The air, which has been deprived of a lot of heat in the evaporator, is released through the nozzle of the indoor unit 44 or outdoor unit 45 in the form of cold blasts.

In the air conditioner 43, a rotational speed command for the brushless motor is set based on driving conditions, that is, a target temperature set for the air conditioner 43, actual room temperature and outdoor air temperature. As discussed earlier in the first embodiment, the motor controller 101 controls the rotational speed of the brushless motor of the compression mechanism 42 based on the set rotational speed command.

Next, the cooling and heating operations of the air conditioner 43 of the above-described configuration will be explained.

Turning to FIG. 17, the air conditioner 43 is formed such that when a driving voltage from the motor controller 101 is applied to the brushless motor (not shown) of the compression mechanism 42, the refrigerant circulates within the refrigerant circulation path. At that time, heat exchanging is carried out by the heat exchanger 48 of the inside unit 44 and the heat exchanger 49 of the outside unit 45. Specifically, a known heat pump cycle is established in the closed circulation path for the refrigerant by allowing the refrigerant confined in the refrigerant circulation path to circulate by the compression mechanism 42. Thereby, the inside of the room is heated or cooled.

When heating is performed by the air conditioner 43 for instance, the four-way valve 46 is set through operation by the user such that the refrigerant flows in the direction indicated by arrow A. In this case, the indoor heat exchanger 48 operates as a condenser and heat is dissipated through refrigerant circulation in the refrigerant circulation path. Thereby, the inside of the room is heated.

On the other hand, when cooling is performed by the air conditioner 43, the four-way valve 46 is set through operation by the user such that the refrigerant flows in the direction indicated by arrow B. In this case, the indoor heat exchanger 48 operates as an evaporator and the heat of surrounding air is taken in through refrigerant circulation in the refrigerant circulation path. Thereby, the inside of the room is cooled.

During operation, in the air conditioner 43, a rotational speed command is determined based on a target temperature set for the air conditioner 43, actual room temperature and outdoor air temperature, and the rotational speed of the brushless motor of the compression mechanism 42 is controlled by the motor controller 101 based on the determined rotational speed command as described earlier in the first embodiment. As a result, the air conditioner 43 performs cooling or heating to make the room comfortable.

The above discussion has been presented in terms of an air conditioner capable of both cooling and heating. Where the invention is applied to an air conditioner for cooling only, the four-way valve 46 may be eliminated and the refrigerant may be made to flow in the direction indicated by arrow B.

As described above, the invention can provide an air conditioner using a compressor which does not use a high-capacity inductor nor capacitor.

Ninth Embodiment

Figure 18:
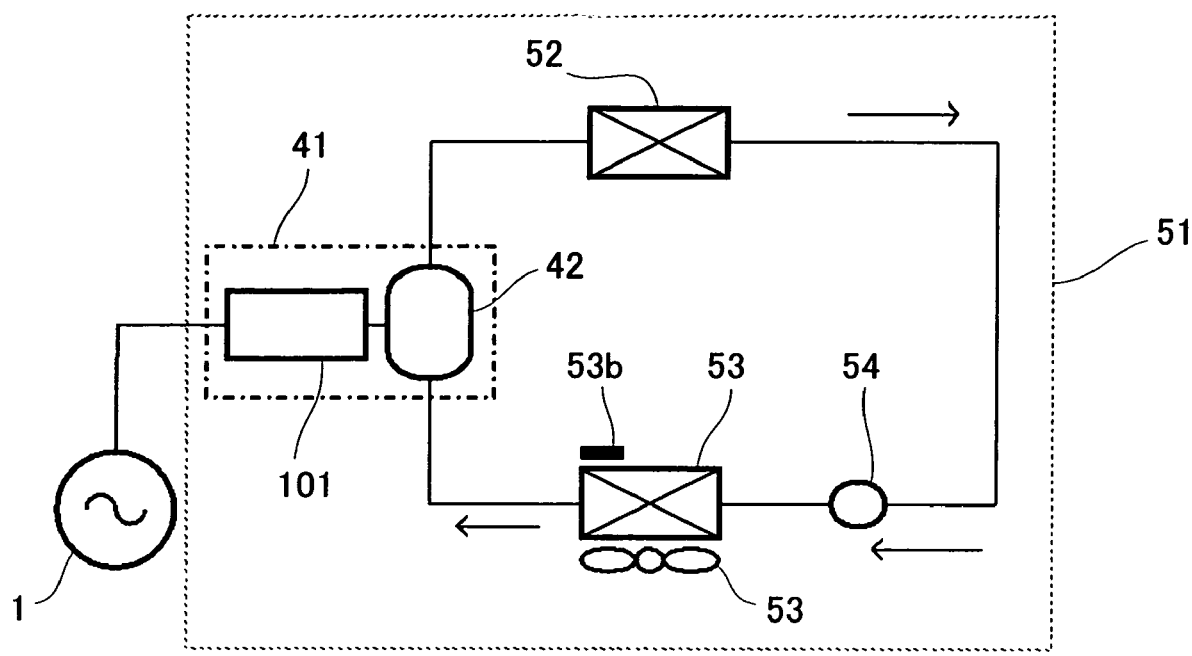
FIG. 18 is a block diagram showing a configuration of a refrigerator according to a ninth embodiment of the invention.

FIG. 18 is a block diagram showing a configuration of a refrigerator according to a ninth embodiment of the invention.

A refrigerator 51 according to the ninth embodiment has the compressor 41, a condenser 52, a chillroom evaporator 53 and a throttle system 54. The compressor 41 consists of the compressor of the seventh embodiment including the compression mechanism 42 and the motor controller 101. Connected to the motor controller 101 is the a.c. power source (single-phase a.c. power source) 1. As described earlier, the compression mechanism 42 is driven by a brushless motor (not shown in FIG. 18) disposed therein and this brushless motor is controlled by the motor controller 101. The brushless motor and the a.c. power source 1 are configured and function similarly to those of the first embodiment. The motor controller 101 consists of any one of the motor controllers described in the first to sixth embodiments. The compression mechanism 42 allows circulation of the refrigerant. In the circulation path for the refrigerant, the condenser 52, the throttle system 54 and the chillroom evaporator 53 are arranged in this order in the circulating direction of the refrigerant.

The condenser 52 condenses the high-temperature, high-pressure gaseous refrigerant flowing therein to emit the heat of the refrigerant to the air. The refrigerant gas sent into the condenser 52 is gradually liquefied when deprived of heat by the air, so that it gets into a high-pressure liquid state or a liquid-gas mixed state in the neighborhood of the outlet of the condenser 52.

Like the throttle system 47 of the air conditioner 43 according to the eighth embodiment, the throttle system 54 expands the refrigerant by reducing the flow rate of the refrigerant sent from the condenser 52 while the refrigerant circulating in the refrigerant circulation path, and, at the same time, supplies the chillroom evaporator 53 with a necessary amount of refrigerant that is neither too much nor too little.

The chillroom evaporator 53 evaporates the low-temperature refrigerant thereby cooling the inside of the refrigerator. The chillroom evaporator 53 includes a fan 53a for increasing the efficiency of heat exchange and a temperature sensor 53b for detecting the inside temperature of the refrigerator.

Next, there will be explained the operation of the refrigerator 51 having the structure described above.

Turning to FIG. 18, in the refrigerator 51, after the motor controller 101 applies a driving voltage to the brushless motor (not shown) of the compression mechanism 42, the compression mechanism 42 is put in operation so that the refrigerant circulates in the direction indicated by arrow within the refrigerant circulation path. At that time, the condenser 52 and the chillroom evaporator 53 perform heat exchange, thereby cooling the inside of the refrigerator 51. In other words, the refrigerant, which has been condensed by the condenser 52, is expanded with its flow rate being reduced by the throttle system 54 and becomes a low-temperature refrigerant. After sent to the chillroom evaporator 53, the low-temperature refrigerant evaporates within the chillroom evaporator 53, thereby cooling the inside of the refrigerator. At that time, the fan 53a forcibly sends air existing within the refrigerator to the chillroom evaporator 53 so that the chillroom evaporator 53 can perform efficient heat exchange.

In the refrigerator 51, a rotational speed command is set according to a target temperature for the refrigerator 51 and the inside temperature of the refrigerator, and, based on this set rotational speed command, the motor controller 101 controls the rotational speed of the brushless motor of the compression mechanism 42 similarly to the eighth embodiment. As a result, the inside of the refrigerator 51 is maintained at the target temperature.

Since the refrigerator 51 of the ninth embodiment has the compressor 41 which causes less vibration and has a low power factor, the degree of freedom for the position of the motor controller 101 within the refrigerator 51 increases compared to the conventional motor controllers. Thanks to the increased degree of freedom of the arrangement of the motor controller 101, the capacity of the refrigerator 51 increases. In addition, since the refrigerator 51 has the lightweight motor controller 101, the weight of the refrigerator 51 can be reduced.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention and all modifications which come within the scope of the appended claims are reserved.

INDUSTRIAL APPLICABILITY

The motor controller of the invention is well suited for use in compressors etc.

The compressor of the invention is well suited for use in electric equipment such as air conditioners and refrigerators.

The air conditioner of the invention is capable of restricting vibration generated by load torque fluctuations without causing a drop in the power factor.

The refrigerator of the invention is capable of restricting vibration generated by load torque fluctuations without causing a drop in the power factor.

The invention claimed is:

1. A motor controller comprising:
   an inverter circuit for driving a brushless motor;
   a control unit for detecting rotational speed fluctuation of a brushless motor caused by load torque fluctuation and controlling a phase and an amplitude of a motor current of the brushless motor so as to restrict said rotational speed fluctuation via the inverter circuit; and
   a rectifier for rectifying an a.c. power output from an a.c. power source to output to the inverter circuit,
   wherein the control unit controls the amplitude of the motor current according to an absolute value of an output voltage of the a.c. power source such that a current flowing in the brushless motor becomes small during a period when the absolute value of the output voltage of the a.c. power source increases and becomes great during a period when the absolute value of the output voltage of the a.c. power source decreases.

2. The motor controller according to claim 1, further comprising a capacitor interposed between d.c. power input terminals of the inverter circuit.

3. The motor controller according to claim 1, wherein the brushless motor drives a load the torque of which fluctuates so as to have one peak per rotation of the brushless motor.

4. A compressor having the brushless motor controlled by the motor controller of claim 3, as a driving source.

5. An air conditioner having the compressor of claim 4, as refrigerant compressing means.

6. A refrigerator having the compressor of claim 4, as refrigerant compressing means.

7. A motor controller comprising:
   a power converter for converting an a.c. power output from an a.c. power source into a d.c. power;
   an inverter circuit for supplying the d.c. power obtained through the conversion by use of the power converter to a brushless motor, thereby driving the brushless motor;
   a capacitor connected between d.c. power input terminals of the inverter circuit; and
   a control unit for controlling the rotational speed of the brushless motor by controlling the motor current of the brushless motor,
   wherein the control unit controls the motor current via the inverter circuit so as to restrict the rotational speed fluctuation of the brushless motor caused by load torque fluctuation and controls a current output from the a.c. power source to the power converter based on the comparison between the amplitude of the motor current and the average of the motor current.

8. The motor controller according to claim 7, wherein the control unit controls the current output from the a.c. power source such that during the period when the amplitude of the motor current is smaller than the average of the motor current, the capacitor is charged, and during the period when the amplitude of the motor current is larger than the average, the capacitor discharges electricity.

9. The motor controller according to claim 8, wherein the power converter is a rectifier, wherein a switching element is serially connected to the capacitor between the d.c. power input terminals of the inverter circuit, and wherein the control unit controls the current output from the a.c. power source by turning the switching element ON and OFF.

10. The motor controller according to claim 8, wherein the control unit controls the current output from the a.c. power source such that during the period when the amplitude of the motor current is smaller than the average of the motor current, said amplitude decreases, and during the period when the amplitude of the motor current is larger than the average of the motor current, said amplitude increases.

11. The motor controller according to claim 7, wherein the control unit controls the phase of the motor current so as to restrict the rotational speed fluctuation of the brushless motor caused by load torque fluctuation.

* * * * *